US011502940B2

(12) United States Patent
Retana et al.

(10) Patent No.: US 11,502,940 B2
(45) Date of Patent: Nov. 15, 2022

(54) EXPLICIT BACKUPS AND FAST RE-ROUTE MECHANISMS FOR PREFERRED PATH ROUTES IN A NETWORK

(71) Applicant: HUAWEI TECHNOLOGIES CO., LTD., Shenzhen (CN)

(72) Inventors: Alvaro Retana, Santa Clara, CA (US); Uma S. Chunduri, Fremont, CA (US); Renwei Li, Fremont, CA (US); Toerless Eckert, Mountain View, CA (US); Yingzhen Qu, San Jose, CA (US)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 17/083,039

(22) Filed: Oct. 28, 2020

(65) Prior Publication Data
US 2021/0051092 A1    Feb. 18, 2021

Related U.S. Application Data

(63) Continuation of application No. PCT/US2019/025635, filed on Apr. 3, 2019.
(Continued)

(51) Int. Cl.
*H04L 45/00*        (2022.01)
*H04L 45/021*      (2022.01)
*H04L 45/28*       (2022.01)

(52) U.S. Cl.
CPC ............ *H04L 45/22* (2013.01); *H04L 45/021* (2013.01); *H04L 45/28* (2013.01)

(58) Field of Classification Search
CPC ....... H04L 45/22; H04L 45/021; H04L 45/28; H04L 45/34
See application file for complete search history.

(56) References Cited

U.S. PATENT DOCUMENTS

| 5,502,816 A | 3/1996 | Gawlick et al. |
| 7,751,405 B1 | 7/2010 | Kompella |
| (Continued) | | |

FOREIGN PATENT DOCUMENTS

| CN | 101036134 A | 9/2007 |
| CN | 101401083 A | 4/2009 |
| (Continued) | | |

OTHER PUBLICATIONS

Atlas, A., Ed., et al., "Basic Specification for IP Fast Reroute: Loop-Free Alternates," RFC 5286, Sep. 2008, 31 pages.
(Continued)

*Primary Examiner* — Patrice L Winder
(74) *Attorney, Agent, or Firm* — Conley Rose, P.C.

(57) ABSTRACT

A method implemented by a network element (NE) in a network, comprising receiving, by the NE, an advertisement comprising preferred path route (PPR) information and backup PPR information, the PPR information describing a PPR between a source and a destination in the network, the backup PPR information describing a backup PPR between the source and the destination, the PPR information comprising a PPR identifier (PPR-ID) and a plurality of PPR description elements (PPR-PDEs) each representing an element on the PPR, updating, by the NE, a local forwarding database to include the PPR information and the backup PPR information in association with a destination address of the destination, and transmitting, by the NE, a data packet based on the backup PPR information instead of the PPR information in response to an element on the PPR being unavailable due to a failure of an element along the PPR.

20 Claims, 15 Drawing Sheets

Related U.S. Application Data

(60) Provisional application No. 62/666,946, filed on May 4, 2018.

(56) References Cited

U.S. PATENT DOCUMENTS

| | | | | |
|---|---|---|---|---|
| 8,830,826 | B2* | 9/2014 | Chen | H04L 45/22 370/228 |
| 9,369,371 | B2* | 6/2016 | Filsfils | H04L 43/50 |
| 9,450,817 | B1 | 9/2016 | Bahadur et al. | |
| 9,660,897 | B1 | 5/2017 | Gredler | |
| 9,838,246 | B1* | 12/2017 | Hegde | H04L 41/0816 |
| 10,003,519 | B2* | 6/2018 | Lee | H04L 45/02 |
| 10,122,614 | B2* | 11/2018 | Eckert | H04L 45/16 |
| 10,142,220 | B2* | 11/2018 | G. Santos | H04L 41/0636 |
| 10,178,029 | B2* | 1/2019 | Levy | H04L 47/12 |
| 10,547,538 | B2* | 1/2020 | Chen | H04L 45/16 |
| 11,032,197 | B2* | 6/2021 | Nainar | H04L 45/745 |
| 2003/0005149 | A1* | 1/2003 | Haas | H04L 45/02 709/238 |
| 2003/0014540 | A1 | 1/2003 | Sultan et al. | |
| 2004/0208119 | A1* | 10/2004 | Christodoulou | H04L 67/1068 370/431 |
| 2006/0117110 | A1 | 6/2006 | Vasseur et al. | |
| 2007/0214275 | A1 | 9/2007 | Mirtorabi et al. | |
| 2008/0075016 | A1 | 3/2008 | Ashwood-Smith | |
| 2009/0185494 | A1 | 7/2009 | Li et al. | |
| 2010/0220736 | A1* | 9/2010 | Mohapatra | H04L 45/22 370/401 |
| 2011/0032945 | A1 | 2/2011 | Mullooly et al. | |
| 2011/0069713 | A1 | 3/2011 | Mariblanca Nieves | |
| 2013/0103739 | A1 | 4/2013 | Salgueiro et al. | |
| 2013/0286846 | A1 | 10/2013 | Atlas et al. | |
| 2014/0379910 | A1 | 12/2014 | Saxena et al. | |
| 2015/0055654 | A1 | 2/2015 | Song | |
| 2015/0078205 | A1 | 3/2015 | Stoger | |
| 2015/0229618 | A1 | 8/2015 | Wan et al. | |
| 2015/0244607 | A1 | 8/2015 | Han | |
| 2015/0244628 | A1 | 8/2015 | Gredler et al. | |
| 2016/0192029 | A1 | 6/2016 | Bergstrom | |
| 2016/0308758 | A1 | 10/2016 | Li et al. | |
| 2017/0012895 | A1 | 1/2017 | Zhao et al. | |
| 2017/0061138 | A1 | 3/2017 | Lambert | |
| 2017/0104668 | A1 | 4/2017 | Zhang et al. | |
| 2017/0187629 | A1 | 6/2017 | Shalev et al. | |
| 2017/0230276 | A1 | 8/2017 | Ceccarelli et al. | |
| 2017/0289027 | A1 | 10/2017 | Ratnasingham | |
| 2017/0346718 | A1 | 11/2017 | Psenak et al. | |
| 2018/0351864 | A1 | 12/2018 | Jeganathan et al. | |
| 2019/0058657 | A1 | 2/2019 | Chunduri et al. | |
| 2019/0278284 | A1 | 9/2019 | Zhang et al. | |
| 2020/0021515 | A1 | 1/2020 | Michael et al. | |
| 2021/0176168 | A1 | 6/2021 | Eckert et al. | |

FOREIGN PATENT DOCUMENTS

| | | | | |
|---|---|---|---|---|
| CN | 106063203 | A | 10/2016 | |
| CN | 106301952 | A * | 1/2017 | H04L 41/0663 |
| CN | 107637031 | A | 1/2018 | |
| WO | WO-2015167479 | A1 * | 11/2015 | H04L 45/28 |
| WO | 2017141078 | A1 | 8/2017 | |

OTHER PUBLICATIONS

Bryant, S., et al., "Remote Loop-Free Alternate (LFA) Fast Reroute (FRR)," RFC 7490, Apr. 2015, 29 pages.

Bashandy, A., et al., "Loop avoidance using Segment Routing, draft-bashandy-rtgwg-segment-routing-uloop-03," Apr. 2, 2018, 7 pages.

Bashandy, A., et al., "Topology Independent Fast Reroute using Segment Routing, draft-bashandy-rtgwg-segment-routing-ti-lfa-05," Oct. 4, 2018, 19 pages.

Chunduri, Uma S.; U.S. Appl. No. 62/634,425; Title: "Advertising and Programming a Non-Shortest Path Forwarding Identifier in Interior Gateway Protocols"; filed Feb. 23, 2018.

Sivabalan, S., et al., "PCEP Extensions for Segmemt Routing," draft-ietf-pce-segment-routing-11, Nov. 20, 2017, 22 pages.

Chunduri, U., Ed., et al., "Usage of Non Shortest Path Forwarding (NSPF) IDs in IS-IS," draft-ct-isis-nspfid-for-sr-paths-01, Mar. 23, 2018, 16 pages.

Chunduri, U., "BGP Link-State extensions for NSPF ID," draft-chunduri-idr-bgp-ls-nspfid-00, Apr. 2, 2018, 7 pages.

Bashandy, A., et al., "Topology Independent Fast Reroute using Segment Routing," draft-bashandy-rtgwg-segment-routing-ti-lfa-04, Mar. 30, 2018, 18 pages.

Mirsky, G., et al., "Bidirectional Forwarding Detection (BFD) in Segment Routing Networks Using MPLS Dataplane," draft-mirsky-spring-bfd-05, Mar. 1, 2018, 11 pages.

Chunduri, U., et al., "Usage of Non Shortest Path Forwarding (NSPF) IDs in OSPF," draft-ct-ospf-nspfid-for-sr-paths-00, Mar. 24, 2018, 14 pages.

Atlas, A., et al., An Architecture for IP/LDP Fast Reroute Using Maximally Redundant Trees (MRT-FRR) RFC 7812, Jun. 2016, 44 pages.

Crabbe, E., "Path Computation Element Communication Protocol (PCEP) Extensions for PCE-Initiated LSP Setup in a Stateful PCE Model," RFC 8281, Dec. 2017, 20 pages.

Kumar N., Ed., et al., "Label Switched Path (LSP) Ping/Traceroute for Segment Routing (SR) IGP-Prefix and IGP-Adjacency Segment Identifiers (SIDs) with MPLS Data Planes," RFC 8287, Dec. 2017, 25 pages.

Hegde, S., "Traffic Accounting for MPLS Segment Routing Paths," draft-hegde-spring-traffic-accounting-for-sr-paths-01, Oct. 30, 2017, 14 pages.

Revidi, S., Ed., et al., "IPv6 Segment Routing Header (SRH)," draft-ietf-6man-segment-routing-header-08, Jan. 20, 2018, 35 pages.

Xu, X., et al., "Signaling Entropy Label Capability and Readable Label-stack Depth Using IS-IS," draft-ietf-isis-mpls-elc-03, Jan. 3, 2018, 6 pages.

Previdi, S., Ed., et al., "IS-IS Extensions for Segment Routing," draft-ietf-isis-segment-routing-extensions-15, Dec. 19, 2017, 34 pages.

Tantsura, J., et al., "Signaling MSD (Maximum SID Depth) using IS-IS," draft-ietf-isis-segment-routing-msd-09, Jan. 10, 2018, 9 pages.

Dhody, D., Ed., et al., "A YANG Data Model for Path Computation Element Communications Protocol (PCEP)" draft-ietf-pce-pcep-yang-06, Jan. 5, 2018, 108 pages.

Filsfils, C., Ed., et al., "Segment Routing Architecture," draft-ietf-spring-segment-routing-14, Dec. 20, 2017, 31 pages.

Litkowski, S., et al., "YANG Data Model for Segment Routing," draft-ietf-spring-sr-yang-08, Dec. 28, 2017, 29 pages.

Awduche, D., et al., "PSVP-TE: Extensions to RSVP for LSP Tunnels," RFC 3209, Dec. 2001, 61 pages.

Kompella, K., et al., "The Use of Entropy Labels in MPLS Forwarding," Nov. 2012, RFC 6790, 25 pages.

Quinn, P., Ed., et al., Network Service Header (NSH), Jan. 2018, RFC 8300, 40 pages.

Chunduri, U., et al., "Preferred Path Routing (PPR) in IS-IS,"draft-chunduri-lsr-isis-preferred-path-routing-01, Jul. 2, 2018, 51 pages.

Qu, Y., et al., "YANG Data Model for Preferred Path Routing," draft-qct-lsr-ppr-yang-00, Jun. 27, 2018, 56 pages.

Psenak, P., et al., "OSPFv2 Prefix/Link Attribute Advertisement," RFC 7684, Nov. 2015, 15 pages.

Filsfils, C., Ed., et al., "Segment Routing Architecture," RFC 8402, Jul. 2018, 32 pages.

Bates, et al.,"Multiprotocol Extensions for BGP-4," RFC 4760, Jan. 2007, 12 pages.

Psenak, et al., "Multi-Topology (MT) Routing in OSPF," RFC 4915, Jun. 2007, 20 pages.

Przygiena, et al., "M-ISIS: Multi Topology (MT) Routing in Intermediate System to Intermediate Systems (IS-Iss)," RFC 5120 Feb. 2008, 14 pages.

Gredler, Ed., et al., "North-Bound Distribution of Link-State and Traffic Engineering (TE) Information Using BGP," RFC 7752, Mar. 2016, 48 pages.

(56) References Cited

OTHER PUBLICATIONS

Han, L., et al., "Ipv6 in-band signaling for the support of transport with QoS," draft-han-6man-in-band-signaling-for-transport-qos-00, Oct. 11, 2017, 40 pages.
Revidi, S., et al., "Ipv6 Segment Routing Header (SRH)," draft-ietf-6man-segment-routing-header-11, Mar. 28, 2018, 34 pages.
Filsfils, C., Ed., et al., "Segment Routing Architecture," draft-ietf-spring-segment-routing-15, Jan. 25, 2018, 31 pages.
Chunduri, Uma S.; U.S. Appl. No. 62/649,355; Title: "Method and Apparatus for NonShortest Path Forwarding Identifiers (NSPF ID) Distribution and Maintenance"; filed Feb. 28, 2018.
Adams, C., et al., "The Simple Public-Key GSS-API Mechanism (SPKM)," RFC 2025, 45 pages.
Braden, R., Ed., et al., "Resource Reservation Protocol (RSVP)," RFC 2205, Sep. 1997, 112 pages.
Li, T., et al., "IS-IS Extensions for Traffic Engineering," RFC 5305, Oct. 2008, 17 pages.
Previdi, S., Ed., et al., "IS-IS Traffic Engineering (TE) Metric Extensions," RFC 7810, May 2016, 18 pages.
Alimi, Ed., et al., "Application-Layer Traffic Optimization (ALTO) Protocol," RFC 7285, Sep. 2014, 91 pages.
U.S. Appl. No. 62/663,115; Title: "Resource Reservations and Maintenance for Preferred Paths in the Network Through Routing Protocols," filed Apr. 26, 2019.

\* cited by examiner

EXPLICIT BACKUPS AND FAST RE-ROUTE MECHANISMS FOR PREFERRED PATH ROUTES IN A NETWORK

CROSS-REFERENCE TO RELATED APPLICATIONS

The present application is a continuation of International Patent Application PCT/US2019/025635 filed Apr. 3, 2019 by Futurewei Technologies, Inc. and claims the benefit of U.S. Provisional Patent Application No. 62/666,946 filed May 4, 2018, by Alvaro Retana, et. al., and entitled "Explicit and Preferred Fast Re-Route Alternatives for Preferred Path Routes (PPR)," which is incorporated herein by reference as if reproduced in their entireties.

FIELD OF INVENTION

The present disclosure pertains to the field of preferred path routing. In particular, the present disclosure relates to provisioning backup loop free alternative paths and backup end-to-end preferred path routes (PPRs) for an original PPR.

BACKGROUND

In a network implementing source routing, a controller that has knowledge of a complete topology of the underlying network can program an ingress node of the network with a custom path that certain traffic has to travel to reach a destination. This custom path may not necessarily be the shortest path between the ingress node and the destination and may be programmed based on traffic engineering or business requirements. An ingress node in the network may use a separate flow classification technique to associate certain traffic flow with a custom path (e.g., a source and/or destination addresses/or transport layer port information).

In a network implementing segment routing (SR), packets are steered through the network using segment identifiers (SIDs) that uniquely identify segments in the network. A segment may include one or more nodes, interfaces, and links between two nodes in the network. The SIDs are typically carried in the header of the packet.

Currently there are two data planes that use segment routing to provision custom paths in a network—Segment Routing (SR) Multi-Protocol Label Switching (MPLS) (SR-MPLS) and SR-Internet Protocol (IP) Version 6 (IPv6) (SR-IPv6). In SR-MPLS, each segment is encoded as a label, and an ordered list of segments are encoded as a stack of labels in the header of the packet. Similarly, in SR-IPv6, each segment is encoded as an IPv6 address within a segment routing header (SRH).

SUMMARY

According to a first aspect of the present disclosure, there is provided a method implemented by a network element (NE) in a network, comprising receiving, by the NE, an advertisement comprising preferred path route (PPR) information and backup PPR information, the PPR information describing a PPR between a source and a destination in the network, the backup PPR information describing a backup PPR between the source and the destination, the PPR information comprising a PPR identifier (PPR-ID) and a plurality of PPR description elements (PPR-PDEs) each representing an element on the PPR, updating, by the NE, a local forwarding database to include the PPR information and the backup PPR information in association with a destination address of the destination, and transmitting, by the NE, a data packet based on the backup PPR information instead of the PPR information in response to an element on the PPR being unavailable due to a failure of an element along the PPR.

In a first implementation of the method according to the first aspect, the backup PPR information comprises a backup PPR-PDE describing a backup element on the PPR, wherein transmitting the data packet based on the backup PPR information comprises transmitting the data packet to the backup element instead of a next element on the PPR in response to determining that the next element on the PPR is unavailable.

In a second implementation of the method according to the first aspect or any preceding implementation of the first aspect, a PPR-PDE describing the NE and included in the plurality of PPR-PDEs comprises a flag indicating that the backup element is described in the backup PPR-PDE.

In a third implementation of the method according to the first aspect or any preceding implementation of the first aspect, the local forwarding database is updated to include a plurality of PPR-PDEs in association with the destination address of the destination and a backup PPR-PDE in association with a PPR-PDE describing the NE.

In a fourth implementation of the method according to the first aspect or any preceding implementation of the first aspect, the method further comprises determining, by the NE, that a next element on the PPR is unavailable, searching, by the NE, the local forwarding database for a backup PPR-PDE describing a backup element for the next element on the PPR, and transmitting, by the NE, the data packet to the backup element instead of the next element on the PPR.

In a fifth implementation of the method according to the first aspect or any preceding implementation of the first aspect, a backup element comprises at least one of a link, another NE, or a segment adjacent to the NE.

In a sixth implementation of the method according to the first aspect or any preceding implementation of the first aspect, a next element comprises at least one of a link, another NE, or a segment adjacent to the NE.

In a seventh implementation of the method according to the first aspect or any preceding implementation of the first aspect, an attribute associated with a resource reserved on the PPR matches an attribute associated with a resource reserved on the backup PPR.

In an eighth implementation of the method according to the first aspect or any preceding implementation of the first aspect, the local forwarding database is updated to include the PPR information and the backup PPR information only in response to determining that the NE is identified in one of the PPR-PDEs.

In a ninth implementation of the method according to the first aspect or any preceding implementation of the first aspect, the local forwarding database is updated to include the PPR information and the backup PPR information regardless of whether the NE is identified is identified in one of the PPR-PDEs.

In a tenth implementation of the method according to the first aspect or any preceding implementation of the first aspect, the advertisement comprises a flag set to indicate that the PPR-ID identifies a loose PPR between the source and the destination, and wherein the plurality of PPR-PDEs describes a subset of NEs on the PPR.

In an eleventh implementation of the method according to the first aspect or any preceding implementation of the first aspect, in response to determining that the element on a path between two NEs of the loose PPR is unavailable, the method further comprises searching, by the NE, the local forwarding database for a backup PPR-PDE describing a backup element for a next element on the PPR, and transmitting, by the NE, the data packet to the backup element instead of the next element on the PPR.

In a twelfth implementation of the method according to the first aspect or any preceding implementation of the first aspect, the backup PPR information comprises a backup PPR-ID identifying the backup PPR, and wherein the local forwarding database includes a plurality of backup PPR-PDEs representing elements on the backup PPR.

In a thirteenth implementation of the method according to the first aspect or any preceding implementation of the first aspect, wherein updating the local forwarding database to include the PPR information and the backup PPR information in association with the destination address of the destination comprises updating the local forwarding database to indicate that the data packet comprising the PPR-ID should be forwarded to a next element as indicated by one of a plurality of PPR-PDEs representing elements on the backup PPR in response to a next element on the PPR being unavailable.

In a fourteenth implementation of the method according to the first aspect or any preceding implementation of the first aspect, further comprising determining, by the NE, that a next element on the PPR is unavailable, searching, by the NE, the local forwarding database for a backup PPR-ID describing the backup PPR, updating, by the NE, the data packet to include the backup PPR-ID instead of the PPR-ID, and transmitting, by the NE, the data packet along the backup PPR instead of the next element on the PPR.

In a fifteenth implementation of the method according to the first aspect or any preceding implementation of the first aspect, the backup PPR information includes a backup PPR-ID identifying the backup PPR and a backup PPR-PDE describing a backup element on the PPR.

In a sixteenth implementation of the method according to the first aspect or any preceding implementation of the first aspect, further comprising determining, by the NE, that a next element on the PPR is unavailable, transmitting, by the NE, the data packet to a backup element instead of the next element on the PPR in response to the local forwarding database storing a backup PPR-PDE describing the backup element for the next element on the PPR, and transmitting, by the NE, the data packet along the backup PPR in response to the local forwarding database not storing the backup PPR-PDE describing the backup element for the next element on the PPR and in response to the local forwarding database storing a backup PPR-ID describing a backup PPR.

In a seventeenth implementation of the method according to the first aspect or any preceding implementation of the first aspect, the PPR information includes a flag indicating that the data packet should not be rerouted in response to the element on the PPR being unavailable.

In an eighteenth implementation of the method according to the first aspect or any preceding implementation of the first aspect, the PPR information includes a flag indicating that the data packet should be rerouted to a preconfigured loop free alternative (LFA) path in response to the element on the PPR being unavailable.

In a nineteenth implementation of the method according to the first aspect or any preceding implementation of the first aspect, the PPR is determined based on a network characteristic requested by the source.

In a twentieth implementation of the method according to the first aspect or any preceding implementation of the first aspect, the advertisement is received from at least one of a second NE in the network or a central entity of the network.

In a twenty-first implementation of the method according to the first aspect or any preceding implementation of the first aspect, the PPR-ID is at least one of a Multi-Protocol Label Switching (MPLS) label, a segment identifier (SID), an Internet Protocol (IP) version 4 (IPv4) address, or an IP version 6 (IPv6) address.

According to a second aspect of the present disclosure, there is provided an NE implemented in a network. The NE comprises a receiver configured to receive an advertisement comprising preferred path route (PPR) information and backup PPR information, the PPR information describing a PPR between a source and a destination in the network, the backup PPR information describing a backup PPR between the source and the destination, the PPR information comprising a PPR identifier (PPR-ID) and a plurality of PPR description elements (PPR-PDEs) each representing an element on the PPR, a processor coupled to the receiver and configured to update a local forwarding database to include the PPR information and the backup PPR information in association with a destination address of the destination, and a transmitter coupled to the processor and configured to transmit a data packet based on the backup PPR information instead of the PPR information in response to an element on the PPR being unavailable due to a failure on an element of the PPR.

According to a third aspect of the present disclosure, there is provided a non-transitory medium configured to store a computer program product comprising computer executable instructions that, when executed by a processor of a network element (NE) implemented in a network, cause the processor to receive an advertisement comprising preferred path route (PPR) information and backup PPR information, the PPR information describing a PPR between a source and a destination in the network, the backup PPR information describing a backup PPR between the source and the destination, the PPR information comprising a PPR identifier (PPR-ID) and a plurality of PPR description elements (PPR-PDEs) each representing an element on the PPR, update a local forwarding database to include the PPR information and the backup PPR information in association with a destination address of the destination, and transmit a data packet based on the backup PPR information instead of the PPR information in response to an element on the PPR being unavailable due to a failure on an element of the PPR.

According to a fourth aspect of the present disclosure, there is provided an apparatus comprising a means for receiving an advertisement comprising preferred path route (PPR) information and backup PPR information, the PPR information describing a PPR between a source and a destination in the network, the backup PPR information describing a backup PPR between the source and the destination, the PPR information comprising a PPR identifier (PPR-ID) and a plurality of PPR description elements (PPR-PDEs) each representing an element on the PPR, a means for updating a local forwarding database to include the PPR information and the backup PPR information in association with a destination address of the destination, and a means for transmitting a data packet based on the backup PPR information instead of the PPR information in response to an element on the PPR being unavailable due to a failure on an element of the PPR.

For the purpose of clarity, any one of the foregoing embodiments may be combined with any one or more of the other foregoing embodiments to create a new embodiment within the scope of the present disclosure.

These and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

It should be understood at the outset that although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

Existing mechanisms for determining end-to-end path failures in a network implementing source routing are slow, causes more cases for micro-loops, and excessively cumbersome. In addition, existing mechanisms for fast re-routing and provisioning backup paths do not implement backup paths that satisfy the original traffic engineering (TE) parameters that were used to provision the original end-to-end path.

Disclosed herein are various embodiments directed to provisioning a backup PPR between a source and destination based on attributes defining a TE parameter or network characteristic of an original PPR. In an embodiment, traffic may be re-routed through the backup PPR when an element on the original PPR cannot be reached or is no longer available. In an embodiment, PPR information describing the original PPR and backup PPR information describing the backup PPR is sent to one or more NEs in the network. In various embodiments, the backup PPR may be implemented as a backup element, a backup end-to-end PPR, or a backup end-to-end PPR tree.

Figure 1:
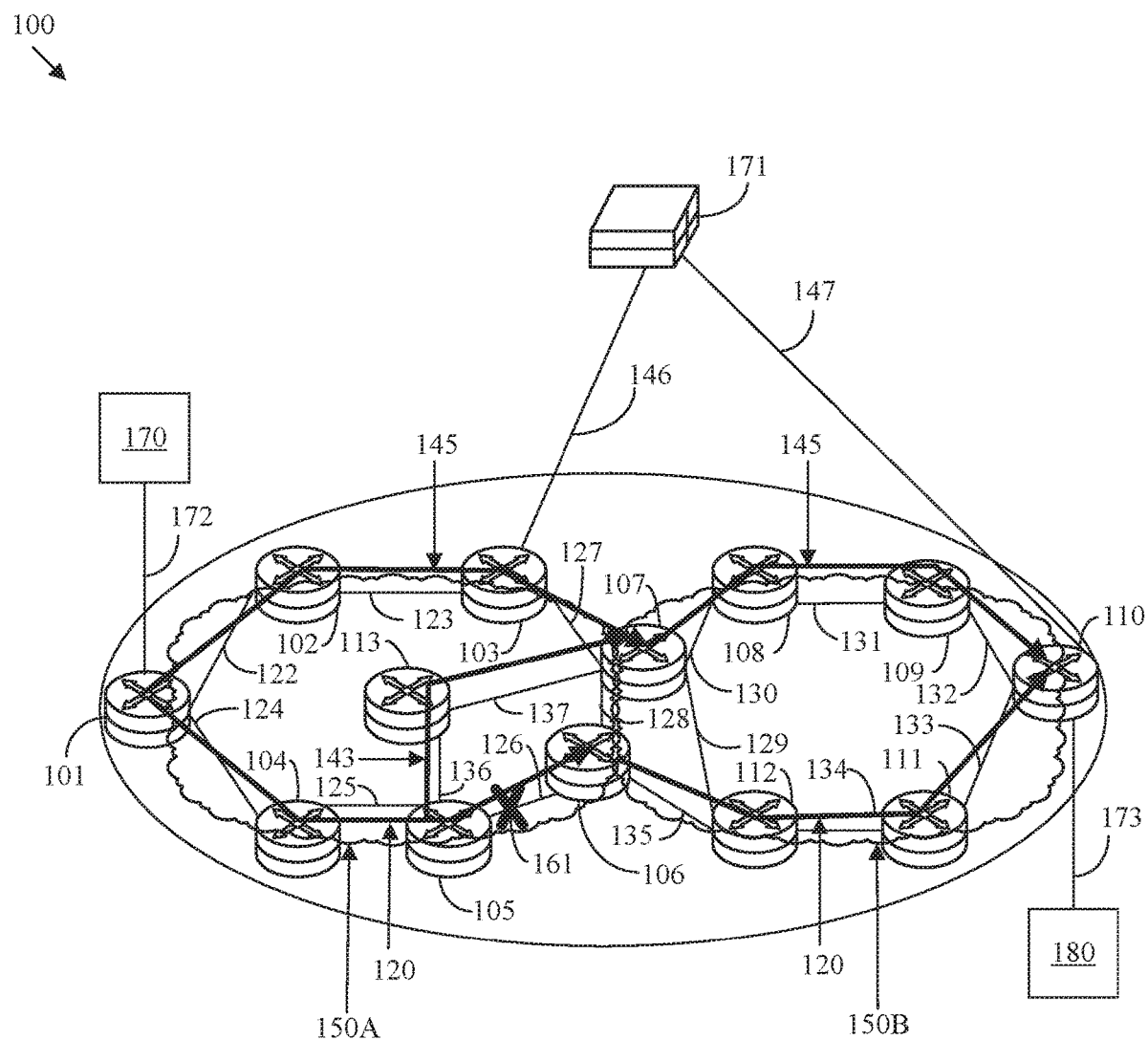
FIG. 1 is a diagram illustrating a network configured to implement preferred path routing according to various embodiments of the disclosure.

FIG. 1 is a diagram illustrating a network 100 (also referred to herein as a "domain" or "subnetwork") configured to implement preferred path routing according to various embodiments of the disclosure. The network 100 comprises a source 170, a destination 180, a central entity 171 (also referred to herein as a "controller"), two areas 150A and 150B, and central entity-to-area links 146 and 147. The source 170 is connected to network 100 via a source-to-domain link 172, and the destination 180 is connected to network 100 via a destination-to-domain link 173.

In an embodiment, the central entity 171 may be a network or domain controller that maintains a topology of the network 100 to craft paths (both shortest paths 145 and PPRs 120) between edge NEs 101-113 in the network 100, as will be further described below. In an embodiment, the central entity is substantially similar to a Path Computation Element (PCE), which is further described in Internet Engineering Task Force (IETF) Request for Comments (RFC) 8281, entitled "Path Computation Element Communication Protocol (PCEP) Extensions for PCE-Initiated LSP Setup in a Stateful PCE Model," by E. Crabbe, dated December 2017. In an embodiment, the central entity 171 may be substantially similar to a Software Defined Network Controller (SDNC), which is further described in the IETF RFC 8402 entitled "Segment Routing Architecture," by C. Filsfils, dated July 2018. In an embodiment, the central entity 171 may be substantially similar to an Application Layer Traffic Optimization (ALTO) server, which is further described in the IETF RFC 7285, entitled "Application Layer Traffic Optimization (ALTO) Protocol," by R. Alimi, dated September 2014.

Areas 150A-B are subnetworks within the network 100 that may be associated with a specific geographic area or building. Each of areas 150A-B may be operated by a different operator or service provider. As shown by FIG. 1, area 150A comprises elements 101-107, 113, 122-128, and 135-137 (e.g., NEs 101-107 and 113 interconnected by links 122-128 and 135-137). Area 150B comprises elements 106-112 and 128-134 (e.g., NEs 106-112 interconnected by links 128-134). As shown by FIG. 1, areas 150A-B both share two NEs 106-107 and link 128. NEs 106-107 and link 128 may be configured to operate within both areas 150A-B using a packet forwarding protocol implemented by both areas 150A-B.

In an embodiment, NEs 101-113 (also referred to herein as "nodes") may be a topological devices (or physical devices), such as a router, a bridge, a network switch, or a logical device configured to perform switching and routing using the preferred path routing mechanisms disclosed herein. In an embodiment, one or more of the NEs 101-113 may be non-topological NEs, such as, for example, a function, context, service, or a virtual machine.

In an embodiment, NEs 101-112 may be headend nodes or edge nodes positioned at an edge of the network 100, and NE 113 is an intermediary node positioned between one or more other NEs in network 100. For example, NE 101 may be an ingress node at which packets are received (either from a source or another NE from another network/domain), and NE 110 may an egress node from which traffic is transmitted (either to a destination or another NE in another network/ domain). While NEs 101-112 are shown in FIG. 1 as headend nodes, it should be appreciated that NEs 101-112 may otherwise be an intermediate node (e.g., similar to NE 113) or any other type of NE. Although only thirteen NEs 101-113 are shown in FIG. 1, it should be appreciated that the network 100 shown in FIG. 1 may include any number of NEs.

In an embodiment, the central entity 171 and NEs 101-113 are configured to implement various packet forwarding protocols, such as, but not limited to, Multi-Protocol Label Switching (MPLS), Segment Routing-MPLS (SR-MPLS), Internet Protocol (IP) Version 4 (IPv4), IP Version 6 (IPv6), Next Generation Explicit Routing (NGER), or Big Packet Protocol. In an embodiment, each area 150A and 150B may be configured to implement a different packet forwarding protocol. For example, NEs 101-107 and 113 in area 150A are configured to implement MPLS, while NEs 106-112 in area 150B are configured to implement IPv6. In such an embodiment, NEs 106 and 107, which are shared between the two areas 150A-B, may be configured to implement both packet forwarding protocols to ensure proper data transmission between areas 150A-B.

The links 122-137 may be wired or wireless links or interfaces interconnecting each of the NEs 101-113 together. The central entity-to-area links 146-147 are also wired or wireless links or interfaces interconnecting at least one of the NEs 101-113 within an area 150A-B to the central entity 171. As described above, the source 170 is connected to network 100 via a source-to-domain link 172, and the destination 180 is connected to network 100 via a destination-to-domain link 173. The source-to-domain link 172 and the destination-to-domain link 173 may be wired or wireless links or interfaces interconnecting each of the source 170 and the destination 180 to an NE 101 and NE 110, respectively, of the network 100.

In operation, the central entity 171 is configured to determine one or more shortest paths 145 between two edge NEs 101-113 in the network 100 and one or more PPRs 120 between two edge NEs 101-112 in the network 100. A shortest path 145 refers to a path between two NEs 101 and 110 (ingress NE 101 and egress NE 110) or between a source 170 and destination 180 that is determined based on a metric, such as, for example, a cost or weight associated with each link on the path, a number of NEs on the path, a number of links on the path, etc. In an embodiment, a shortest path 145 may be computed for a destination using a Dijkstra's Shortest Path First (SPF) algorithm.

A PPR 120 (also referred to herein as a Non-Shortest Path (NSP)) refers to a custom path between an ingress NE 101 and an egress NE 110 or between a source 170 and destination 180 that is determined based on an application or server request. In an embodiment, the PPR 120 deviates from the shortest path 145. However, the PPR 120 may also be the same as the shortest path 145.

In an embodiment, the central entity 171 is configured to determine the PPR 120 based on attributes specified for the PPR 120. As will be further described below, an attribute specified for the PPR 120 may be a TE parameter, network characteristics, or service requirement that is associated with a resource to be reserved on the PPR 120. In an embodiment, the attribute may include a bandwidth requirement, a maximum burst size, a latency requirement, a minimum jitter, a minimum error rate, a required throughput, etc. In an embodiment, reserving resources on the NEs 101-113 and links 122-137 of the PPR 120 according to the attributes specified for the PPR 120 ensures that data packets being transmitted along the PPR 120 satisfy a certain Quality of Service (QoS) parameter set by the source 170 of the PPR 120 or an operator of the network 100.

In an embodiment, a source 170, or an ingress NE 101, transmits a request to the central entity 171 to compute a PPR 120 between the source 170 and the destination 180 (or between the ingress NE 101 and the egress NE 110) according to a particular attribute. In another embodiment, the attributes for a particular PPR 120 may be preconfigured at the central entity 171 by an operator or service provider of the network 100. In an embodiment, the central entity 171 is configured to determine the sequence of elements along PPR 120 according to the attribute requested.

The PPRs 120 and the shortest paths 145 may each comprise a sequential ordering of one or more elements 101-113 and 122-137 (e.g., NEs 101-113 and links 122-137) in the network 100. As shown in FIG. 1, the shortest path 145 between ingress NE 101 and egress NE 110 includes the following elements: NE 101, link 122, NE 102, link 123, NE 103, link 127, NE 107, link 130, NE 108, link 131, NE 109, link 132, and NE 110. As described above, the shortest path 145 between ingress NE 101 and egress NE 110 is based on metrics of each of the elements 101-113 and 122-137 in the network 100.

In contrast, the PPR 120 between ingress NE 101 and egress NE 110 includes the following elements: NE 101, link 124, NE 104, link 125, NE 105, link 126, NE 106, link 135, NE 112, link 134, NE 111, link 133, and NE 110. In an embodiment, the central entity 171 determines the elements on the PPR 120 based on an attribute, such as, bandwidth, latency, or burst size, of each of one or more of the elements (NE 101, link 124, NE 104, link 125, NE 105, link 126, NE 106, link 135, NE 112, link 134, NE 111, link 133, and NE 110) on PPR 120.

After the central entity 171 determines the PPR 120 based on the attribute, the central entity 103 transmits PPR information describing the PPR 120 to a headend or ingress NE 101-112 in each area 150A-B of network 100. For example, the central entity 171 transmits PPR information describing the PPR 120 implemented in area 150A to NE 103 via central entity-to-area link 146. Similarly, the central entity 171 transmits PPR information describing the PPR 120 implemented in area 150B to NE 110 via central entity-to-area link 147.

In an embodiment, the PPR information includes information that describes the PPR 120. The PPR information may include, for example, a PPR-identifier (ID) identifying the PPR 120. In an embodiment, the PPR-ID includes a single label, address, or ID identifying the PPR 120. For example, when the network 100 implements SR-MPLS, the PPR-ID may be an MPLS label or an SID identifying a PPR. When the network 100 implements SRv6, the PPR-ID may be an SRv6 SID identifying a PPR. When the network 100 implements IPv4, the PPR-ID may be an IPv4 address or prefix identifying a PPR. Similarly, when the network 100 implements IPv6, the PPR-ID may be an IPv6 address or prefix identifying a PPR.

The PPR information also includes multiple PPR-path description elements (PDEs) describing one or more elements (NE 101, link 124, NE 104, link 125, NE 105, link 126, NE 106, link 135, NE 112, link 134, NE 111, link 133, and NE 110) or segments including one or more of the elements on the PPR 120. In an embodiment, each of the PPR-PDEs includes a label, address, or ID of one or more of the elements 101, 124, 104, 125, 105, 126, 106, 135, 112, 134, 111, 133, and 110 or segments including one or more of the elements on the PPR 120. In an embodiment, the PPR-PDEs include a sequential ordering of MPLS labels, IPV6 addresses, or IPv4 addresses that specify the actual path (e.g., one or more of the elements 101, 124, 104, 125, 105, 126, 106, 135, 112, 134, 111, 133, and 110 on the PPR 120) toward a destination address of the egress NE 110 or the destination 180 (also referred to herein as a "prefix"). In an embodiment, each of the PPR-PDEs may also define whether the element being described is a topological NE or a non-topological NE.

In various embodiments, two types of PPRs 120 may be described by the PPR-PDEs, a strict PPR 120 and a loose PPR 120. In a strict PPR 120, every single NE (NE 101, 104, NE 105, NE 106, NE 112, NE 111, and NE 110) along the PPR 120 is specified or described in its own PPR-PDE. In a loose PPR 120, certain elements 101, 124, 104, 125, 105, 126, 106, 135, 112, 134, 111, 133, and 110 (also referred to herein as "hops") along a PPR 120 may be skipped such that only a subset of the elements 101, 124, 104, 125, 105, 126, 106, 135, 112, 134, 111, 133, and 110 along a PPR 120 is specified or described in its own PPR-PDE. When loose PPRs 120 are described by the PPR-PDEs, the NEs along the path use shortest path routing in between elements that are not explicitly specified in a PPR-PDE (i.e., to reach the next topological PDE of the loose PPR 120).

The PPR information may include several other descriptive elements, which are further described in Patent Cooperation Treaty (PCT) Application No. PCT/US2019/015419, entitled "Advertising and Programming Preferred Path Routes using Interior Gateway Protocols," by Uma S. Chunduri, et. al., and filed on Jan. 28, 2019 (hereinafter referred to as the "PPR Patent").

The PPR information may also include one or more attributes associated with a resource to be reserved on the PPR 120. As described above, the attribute refers to a TE parameter network characteristic that should be satisfied when reserving a resource on the PPR 120. Examples of attributes specified for a PPR 120 may include bandwidth, burst size, latency, and lifetime, which is further described in PCT Application No. PCT/US2019/025643, entitled "Resource Reservation and Maintenance for Preferred Path Routes in a Network," by Uma S. Chunduri, et. al., and filed on Apr. 3, 2019, (hereinafter referred to as the "Attributes Patent").

In one embodiment, the PPR information includes a flag that indicates whether all the NEs 101-113 in the network 100 should store the PPR information or whether only the NEs 101-113 identified in a PPR-PDE of the PPR information should store the PPR information. For example, suppose the flag in the PPR information indicates that all the NEs 101-113 in the network 100 should store the PPR information. In this case, after receiving the PPR information from the central entity 171, the NEs 103 and 110 update a local forwarding database to include an entry including the PPR information for a destination address corresponding to the egress NE 110 or the destination 180. In an embodiment, the local forwarding database is updated by adding another entry for a particular destination ID or address of the egress NE 110 or the destination 180. The new entry includes at least one of the PPR-ID, each of the PPR-PDEs corresponding the PPR-ID, an ID or address of the next element 101, 124, 104, 125, 105, 126, 106, 135, 112, 134, 111, 133, or 110 on the PPR 120 to which to forward a data packet, and/or the one or more attributes specified for the PPR 120. In this embodiment, NEs 103 and 110 are configured to update the local forwarding database to include the PPR information relative to a destination address of the egress NE 110 or the destination 180 regardless of whether the NE 103 or 110 is identified in a PPR-PDE of the PPR information.

In contrast, suppose the flag in the PPR information indicates that only the NEs 101-113 identified in a PPR-PDE of the PPR information should store the PPR information. In this case, after receiving the PPR information, NEs 103 and 110 first determine whether the NEs 103 and 110 are identified in a PPR-PDE of the PPR information. When a PPR-PDE does not identify the NE 103 or 110, NEs 103 and 110 ignore the PPR information. However, when a PPR-PDE identifies the NE 103 or 110, the NE 103 or 110 updates a local forwarding database to include an entry including the PPR information for a destination address corresponding to the egress NE 110 or the destination 180.

After receiving the PPR information and updating a local forwarding database, the NEs 103 and 110 send (or flood) an advertisement including the PPR information to all of the other NEs 101-113 in the respective area 150A-B of network 100 using the underlying Interior Gateway Protocol (IGP) of the respective area 150A-B. The advertisement including the PPR information may be encoded and flooded through the respective area 150A-B using an IGP, such as, for example, Open Shortest Path First (OSPF) Version 2 (OSPFv2), OSPF Version 3 (OSPFv3), Intermediate System—Intermediate System (IS-IS), or direct SDN. For example, after receiving the PPR information, the NE 103 transmits (or floods) the PPR information to NEs 101-102, 104-107, and 113 in area 150A according to the IGP implemented by area 150A. Similarly, after receiving the PPR information, NE 110 transmits (or floods) the PPR information to NEs 106-109 and 111-112 in area 150B according to the IGP implemented by area 150B.

In an embodiment, each of the receiving NEs 101-102, 104-107, 106-109, and 111-112 either updates the local forwarding database to include the PPR information or ignores the PPR information. The decision as to whether to update the local forwarding database or ignore the PPR information is based on whether the flag in the PPR information indicates that all the NEs 101-113 update a local forwarding database or that only the NEs 101-113 identified in a PPR-PDE of the PPR information are to update the local forwarding database.

In the data plane, NEs 101-113 receive data packets that include a PPR-ID, for example, in a header of the data packet. Each of the NEs 101-113 obtains the PPR-ID from the data packet, and then performs a look up on the local forwarding database to obtain the PPR-PDEs corresponding to the PPR-ID in the data packet. The PPR-PDEs corresponding to the PPR-ID include labels, addresses, or IDs of one or more next elements (e.g., NEs 101-113 or links 122-137) on the PPR 120. For example, ingress NE 101 may receive a data packet comprising a PPR-ID in a header of the data packet. The ingress NE 101 extracts the PPR-ID from the data packet and searches the local forwarding database for one or more PPR-PDEs corresponding to the PPR-ID. The PPR-PDEs stored in association with the PPR-ID indicates that the next element (or next hop) along which to transport the data packet is NE 104. For example, a PPR-PDE identifying the next element may include a label, address, or ID of NE 104. The ingress NE 103 then transmits the data packet to NE 104 along link 124. NEs 104, 105, 106, 112, and 113 on the PPR 120 are configured to forward data packets along the PPR 120 in a similar fashion.

In network 100, when a failure occurs on a link 122-137 on a shortest path 145 or a PPR 120, each of the NEs 101-113 first signal the failure to other NEs 101-113 in the area 150A-B or the network 100 via the underlying IGP. In the event of a failure on a link 122-137, the NEs 101-113 are also typically configured to transmit data packets along a loop free alternate (LFA) path 143 that is pre-configured at the NEs 101-113. A LFA path 143 refers to an alternative path through the network 100 which is different from the PPR 120 and the shortest path 145. The LFA path 143 is computed to reduce the packet loss that occurs when routers converge after topology changes due to a failure on a link 122-137 or a failure of an NE 101-113 on a path. The LFA path 143 is an alternative path by which NE 105 may transmit packets when a failure 161 occurs at link 126 that interconnects NE 105 and 106. As shown in FIG. 1, the LFA path 143 includes NE 105, link 136, NE 113, link 137, NE 107, link 130, NE 108, link 131, NE 109, link 132, and NE 110. NE 105 is configured to detect the failure 161 and automatically redirects data packets through the LFA path 143 instead of link 126. The different variations of an LFA path 143, such as a remote-LFA (RLFA), RLFA with directed forwarding (DLFA), and Topology Independent LFA (TI-LFA), is further described in the Network Working Group (NWG) Internet Draft Document, entitled "Topology Independent Fast Reroute using Segment Routing," by A. Bashandy, et. al., dated Oct. 4, 2018.

In some cases, data packets comprising the PPR-ID and intended to be transmitted along the PPR 120 may also be redirected along the LFA path 143 instead of the PPR 120. However, the LFA path 143 is pre-configured at NE 105, and may not satisfy the same attributes that the original PPR 120 satisfied. For example, PPR 120 may have been provisioned according to an attribute that specified a maximum bandwidth permitted on a link 122-137 along the PPR 120. However, the links 136, 137, 130, 131, and link 132 along the LFA 143 may not satisfy the same maximum bandwidth attribute that the links 124, 125, 126, 135, 134, and 133 along PPR 120 satisfied. Therefore, data packets comprising PPR-ID cannot be effectively redirected along the LFA path 143 when a failure occurs on an element of the PPR 120.

The embodiments disclosed herein are directed to advertising and programming backup PPR information regarding backup PPRs that may satisfy substantially the same attributes of the original PPR 120. In an embodiment, the central entity 171 determines the PPR 120 and backup PPR information describing a backup PPR that should be used when an element on the PPR 120 fails or is unavailable. The backup PPR information includes information regarding a backup element by which to redirect data packets when an element on the PPR 120 fails or is unavailable. The backup PPR information may also include information regarding an end-to-end backup PPR that should be used when an element on the PPR 120 fails or is unavailable. The central entity 171 may send the backup PPR information along with the original PPR information to a headend NE 101-112 such that the headend NE 101-112 floods the area 150A-B with the original PPR information with the original PPR information and the backup PPR information.

Figure 2:
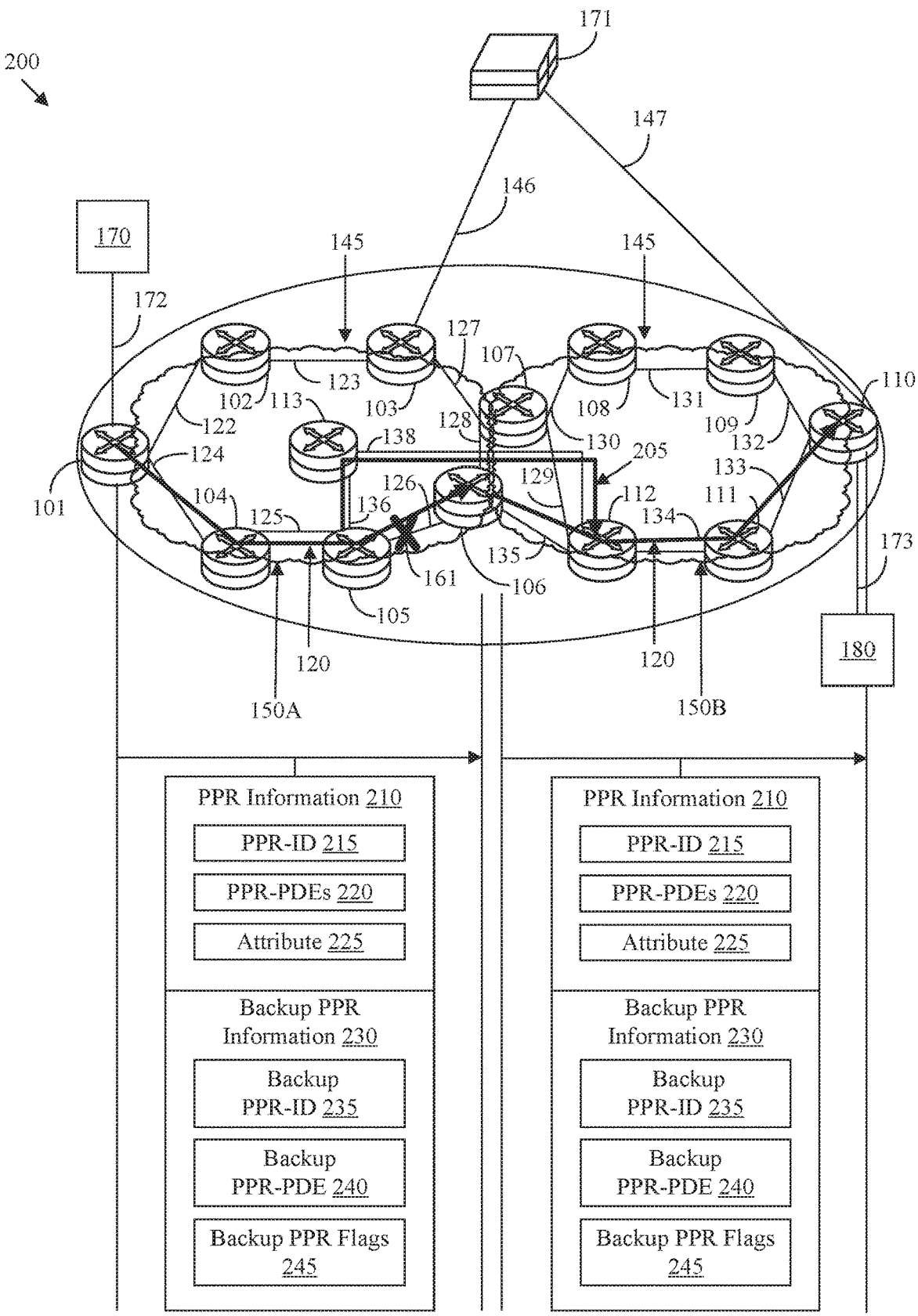
FIG. 2 is a diagram illustrating the network configured to implement backup PPRs and fast re-route mechanisms in the control plane according to various embodiments of the disclosure.

FIG. 2 is a diagram illustrating the network 200 configured to implement backup PPRs and fast re-route mechanisms in the control plane according to various embodiments of the disclosure. The network 200 shown in FIG. 2 is similar to network 100 shown in FIG. 1, except that in network 200, when a failure 161 occurs on link 126, NE 105 redirects data packets with the PPR-ID along the backup PPR 205, instead of the LFA path 143.

As shown by FIG. 2, the backup PPR 205 extends from NE 105, link 136, NE 113, link 138, and back to NE 112, which is on the original PPR 120. In the embodiment show in FIG. 2, the backup PPR 205 converges with the original PPR 120 at NE 112 such that the original PPR 120 resumes at NE 105 and proceeds along link 134, NE 111, link 133, and egress NE 110. In another embodiment, and as will be further described below, the backup PPR 205 may not converge with the original PPR 120, but may instead include a sequence of other NEs 101-113 in the network 200 that may be used to reach the egress NE 110. In an embodiment, the backup PPR 205 satisfies the same or substantially the same attributes as the original PPR 120.

As described above, the central entity 171, which has knowledge of the underlying topology of the network 200, determines the PPR 120 according to a request received from an application or service. In one embodiment, the request includes the attributes that are to be satisfied by the PPR 120. In another embodiment, the operator of the network 200 may input the attributes to the central entity 171 such that the central entity 171 determines the PPR 120 based on the attributes. After determining the sequence of elements (e.g., NE 101, link 124, NE 104, link 125, NE 105, link 126, NE 106, link 135, NE 112, link 134, NE 111, link 133, and NE 110) on the PPR 120, the central entity 171 generates PPR information 210 describing the PPR 120.

In an embodiment, PPR information 210 includes the PPR-ID 215, PPR-PDEs 220, and one or more attributes 225. As described above, the PPR-ID 215 is a label, address, or ID that uniquely identifies the PPR 120. The PPR-PDEs 220 include information describing one or more of the elements (e.g., NE 101, link 124, NE 104, link 125, NE 105, link 126, NE 106, link 135, NE 112, link 134, NE 111, link 133, and NE 110) on the PPR 120. The attributes 225 refer to network characteristics or TE parameters by which a certain resource on the PPR 120 is reserved. In an embodiment, the attributes 225 are enforced by one or more elements 101, 124, 104, 125, 105, 126, 106, 135, 112, 134, 111, 133, and 110 on the PPR 120 to ensure that the PPR 120 satisfies certain QoS parameters.

In an embodiment, the central entity 171 also determines the backup PPR 205 for the PPR 120 that satisfies the same attributes as PPR 120. After determining the sequence of elements (e.g., NE 105, link 136, NE 113, link 138, and NE 112) on the backup PPR 205, the central entity 171 generates the backup PPR information 230 describing the backup PPR 205. In one embodiment, the backup PPR information 230 includes one or more backup PPR-PDEs 240 describing a backup element (NE 113 and/or links 136 and 138) on the backup PPR 205. The backup PPR-PDE 240 may also include an address, label, or ID identifying the backup element on the backup PPR 205. In one embodiment, the backup PPR information 230 includes a backup PPR-ID 235 that uniquely identifies the backup PPR 205. The backup PPR-ID 235 may also be an address, label, or ID that identifies the backup PPR 205. In one embodiment, the backup PPR information 230 includes both the backup PPR-ID 235 and one or more backup PPR-PDEs 240.

In an embodiment, the backup PPR information 230 also includes backup PPR flags 245, which may a bit that indicates a type of backup path to use when an element on the PPR 120 fails or is unavailable. In an embodiment, the backup PPR information 230 includes a backup PPR flag 245, or bit, indicating whether a backup end-to-end PPR should be used to redirect data packets comprising the PPR-ID 215 when a failure occurs on the PPR 120. In an embodiment, the backup PPR information 230 includes a backup PPR flag 245, or bit, indicating whether a backup end-to-end PPR tree should be used to redirect data packets comprising the PPR-ID 215 when a failure occurs on the PPR 120. In an embodiment, the backup PPR flag 245 may also indicate whether a backup element should be used to redirect data packets comprising the PPR-ID 215 when a failure occurs on the PPR 120. The backup PPR flag 245 may also indicate whether an LFA path 143 should be used to redirect data packets comprising the PPR-ID 215 when a failure occurs on the PPR 120. The backup PPR flag 245 may also indicate that data packets comprising the PPR-ID 215 should be dropped and not redirected when a failure occurs on the PPR 120.

After the central entity 171 generates the PPR information 210 and the backup PPR information 230, the central entity 171 transmits the PPR information 210 and the backup PPR information 230 to a headend NE 101-112 in each area 150A-B of network 200. As shown in FIG. 2, the central entity 171 may transmit the PPR information 210 and the backup PPR information 230 to headend NE 103 in area 150A via central entity-to-area link 146. Similarly, the central entity 171 may transmit the PPR information 210 and the backup PPR information 230 to headend NE 110 via central entity-to-area link 147.

In an embodiment, the headend NE 103 in area 150A floods (e.g., transmits) the PPR information 210 and the backup PPR information 230 to the other NEs 101-102, 104-107, and 113 in area 150A. For example, NE 103 transmits the PPR information 210 and the backup PPR information 230 to neighboring NEs 102 and 107. NE 102 transmits the PPR information 210 and the backup PPR information 230 to neighboring NE 101, and NE 107 transmits the PPR information 210 and the backup PPR information 230 to neighboring NE 106. In this way, the PPR information 210 and the backup PPR information 230 is flooded through the area 150A. Similarly, the headend NE 110 floods the PPR information 210 and the backup PPR information 230 to the other NEs 106-109 and 111-112 in the area 150B.

As described above, the PPR information 210 may include a flag indicating whether every single NE 101-113 should update the local forwarding database to include the PPR information 210 and the backup PPR information 230. Alternatively, the PPR information 210 may include a flag indicating whether only the NEs 101-113 identified in the PPR-PDEs 220 and/or backup PPR-PDEs 240 should update the local forwarding database to include the PPR information 210 and the backup PPR information 230.

Updating the local forwarding database to include the PPR information 210 and the backup PPR information 230 includes adding an entry in the local forwarding database corresponding to the destination (e.g., destination address of the destination 180 or the address of egress NE 110). The entry includes the PPR information 210 and the backup PPR information 230.

After updating the local forwarding database to include the PPR information 210 and the backup PPR information 230, the relevant NEs 101-113 are programmed to implement fast re-routing mechanisms for PPR 120 using the backup PPR information 230. In an embodiment, the backup PPR information 230 may include information regarding a backup PPR 205 consisting of a backup element, such that data packets including the PPR-ID 215 should be redirected to the backup element when a failure 161 occurs on a next element (or hop) of the PPR 120. Examples of how a backup element is programmed and implemented in the control plane and the data plane of a network implementing preferred path routing is further described below with regard to FIGS. 4-7.

In an embodiment, the backup PPR information 230 may include information regarding a backup PPR 205 including a backup end-to-end PPR or a backup end-to-end PPR tree, such that data packets including the PPR-ID 215 should be redirected to the backup end-to-end PPR or backup end-to-end PPR tree when a failure 161 occurs on a next element (or hop) of the PPR 120. Examples of how a backup end-to-end PPR or backup end-to-end PPR tree is programmed and implemented in the control plane and the data plane of a network implementing preferred path routing is further described below with regard to FIGS. 8-11.

In an embodiment, the backup PPR information 230 may include information regarding a backup PPR 205 including a backup element and a backup end-to-end PPR, such that data packets including the PPR-ID 215 should be redirected to the either the backup element or backup end-to-end PPR when a failure 161 occurs on a next element (or hop) of the PPR 120. Examples of how the combination of a backup element and a backup end-to-end PPR is programmed and implemented in the control plane and the data plane of a network implementing preferred path routing is further described below with regard to FIGS. 12-13.

Figure 3:
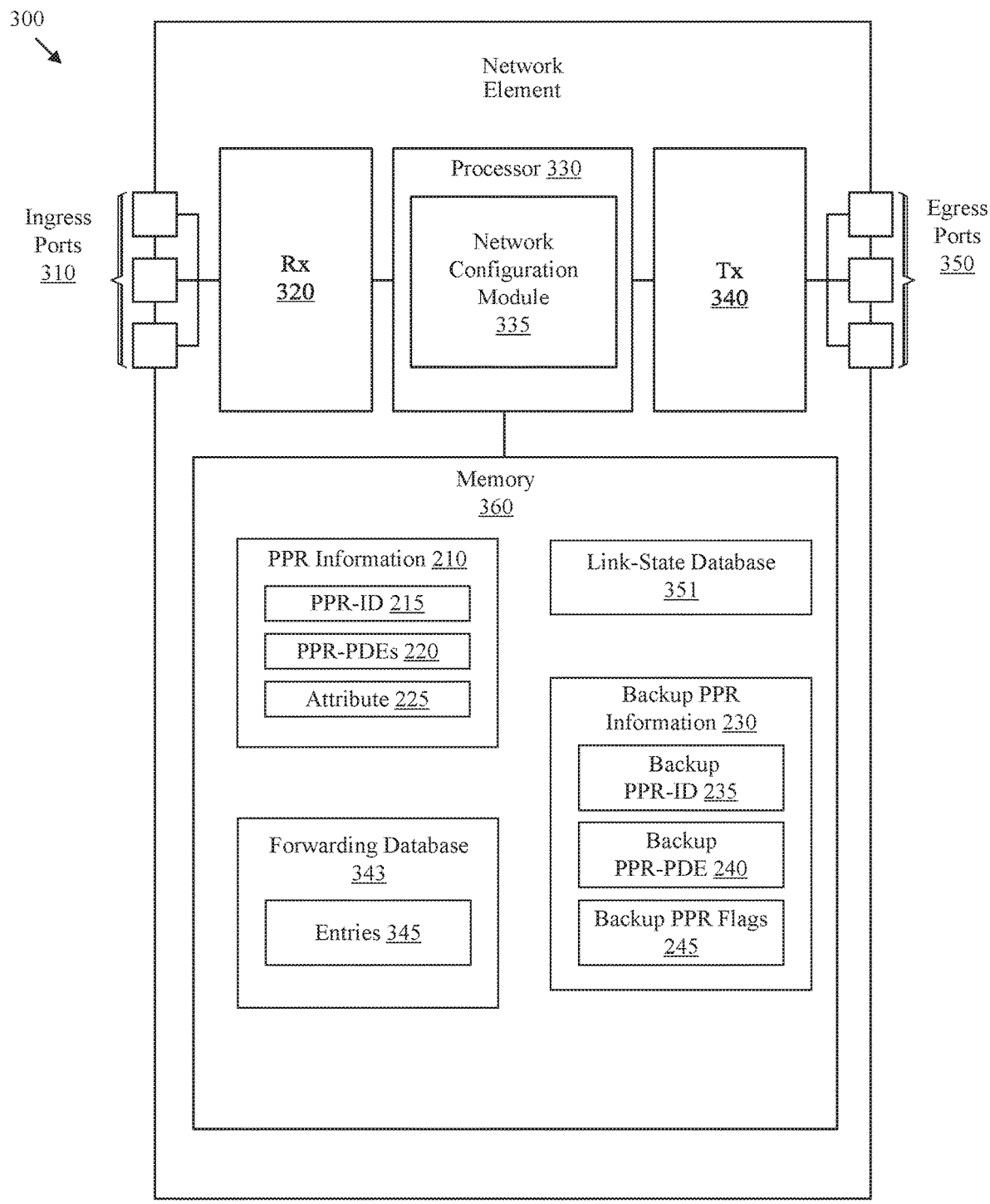
FIG. 3 is an embodiment of an NE in the network configured to implement preferred path routing according to various embodiments of the disclosure.

FIG. 3 is a diagram of an embodiment of an NE 300 in a network such as the network 100 or 200. NE 300 may be implemented as the central entity 171 or the NEs 101-113. The NE 300 may be configured to implement and/or support the routing mechanisms described herein. The NE 300 may be implemented in a single node or the functionality of NE 300 may be implemented in a plurality of nodes. One skilled in the art will recognize that the term NE encompasses a broad range of devices of which NE 300 is merely an example. While NE 300 is described as a physical device, such as a router or gateway, the NE 300 may also be a virtual device implemented as a router or gateway running on a server or a generic routing hardware (whitebox).

The NE 300 is included for purposes of clarity of discussion, but is in no way meant to limit the application of the present disclosure to a particular NE embodiment or class of NE embodiments. At least some of the features and/or methods described in the disclosure may be implemented in a network apparatus or module such as an NE 300. For instance, the features and/or methods in the disclosure may be implemented using hardware, firmware, and/or software installed to run on hardware. As shown in FIG. 3, the NE 300 comprises one or more ingress ports 310 and a receiver unit (Rx) 320 for receiving data, at least one processor, logic unit, or central processing unit (CPU) 330 to process the data, transmitter unit (Tx) 340 and one or more egress ports 350 for transmitting the data, and a memory 360 for storing the data.

The processor 330 may comprise one or more multi-core processors and be coupled to a memory 360, which may function as data stores, buffers, etc. The processor 330 may be implemented as a general processor or may be part of one or more application specific integrated circuits (ASICs) and/or digital signal processors (DSPs). The processor 330 may comprise a network configuration module 335, which may perform processing functions of the central entity 171 or the NEs 101-112. The network configuration module 335 may also be configured to perform the steps of method 1400, and/or any other method discussed herein. As such, the inclusion of the network configuration module 335 and associated methods and systems provide improvements to the functionality of the NE 300. Further, the network configuration module 335 effects a transformation of a particular article (e.g., the network) to a different state. In an alternative embodiment, network configuration module 335 may be implemented as instructions stored in the memory 360, which may be executed by the processor 330.

The memory 360 may comprise a cache for temporarily storing content, e.g., a random-access memory (RAM). Additionally, the memory 360 may comprise a long-term storage for storing content relatively longer, e.g., a read-only memory (ROM). For instance, the cache and the long-term storage may include dynamic RAMs (DRAMs), solid-state drives (SSDs), hard disks, or combinations thereof. The memory 360 may be configured to store the PPR information 210, which includes PPR-IDs 215, PPR-PDEs 220, and attributes 225. In addition, the memory 360 is configured to store the backup PPR information 230, which includes backup PPR-IDs 235, backup PPR-PDEs 240, and backup PPR flags 245. Memory 360 is further configured to store a forwarding database 343, and a link state database 351. In an embodiment, the forwarding database 343 stores entries 345 describing forwarding rules for how a particular NE 300 (e.g., NE 101-113 of FIGS. 1-2) should forward a data packet that includes a PPR-ID 215 and/or a destination address. For example, the forwarding database 343 includes entries 345 for a destination address (of either destination 180 or egress NE 110), in which each entry includes the PPR information 210 and backup PPR information 230 corresponding to the destination address. In an embodiment, the link state database 351 may comprise a network topology of the area 150A-B that the NE 300 (e.g., NE 101-113) is located.

It is understood that by programming and/or loading executable instructions onto the NE 300, at least one of the processor 330 and/or memory 360 are changed, transforming the NE 300 in part into a particular machine or apparatus, e.g., a multi-core forwarding architecture, having the novel functionality taught by the present disclosure. It is fundamental to the electrical engineering and software engineering arts that functionality that can be implemented by loading executable software into a computer can be converted to a hardware implementation by well-known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an ASIC, because for large production runs the hardware implementation may be less expensive than the software implementation. Often a design may be developed and tested in a software form and later transformed, by well-known design rules, to an equivalent hardware implementation in an ASIC that hardwires the instructions of the software. In the same manner as a machine controlled by a new ASIC in a particular machine or apparatus, likewise a computer that has been programmed and/or loaded with executable instructions may be viewed as a particular machine or apparatus. In some embodiments, the NE 300 may be configured to implement OSPFv2, OSPFv3, IS-IS or direct SDN controller based on network implementations.

Figure 4:
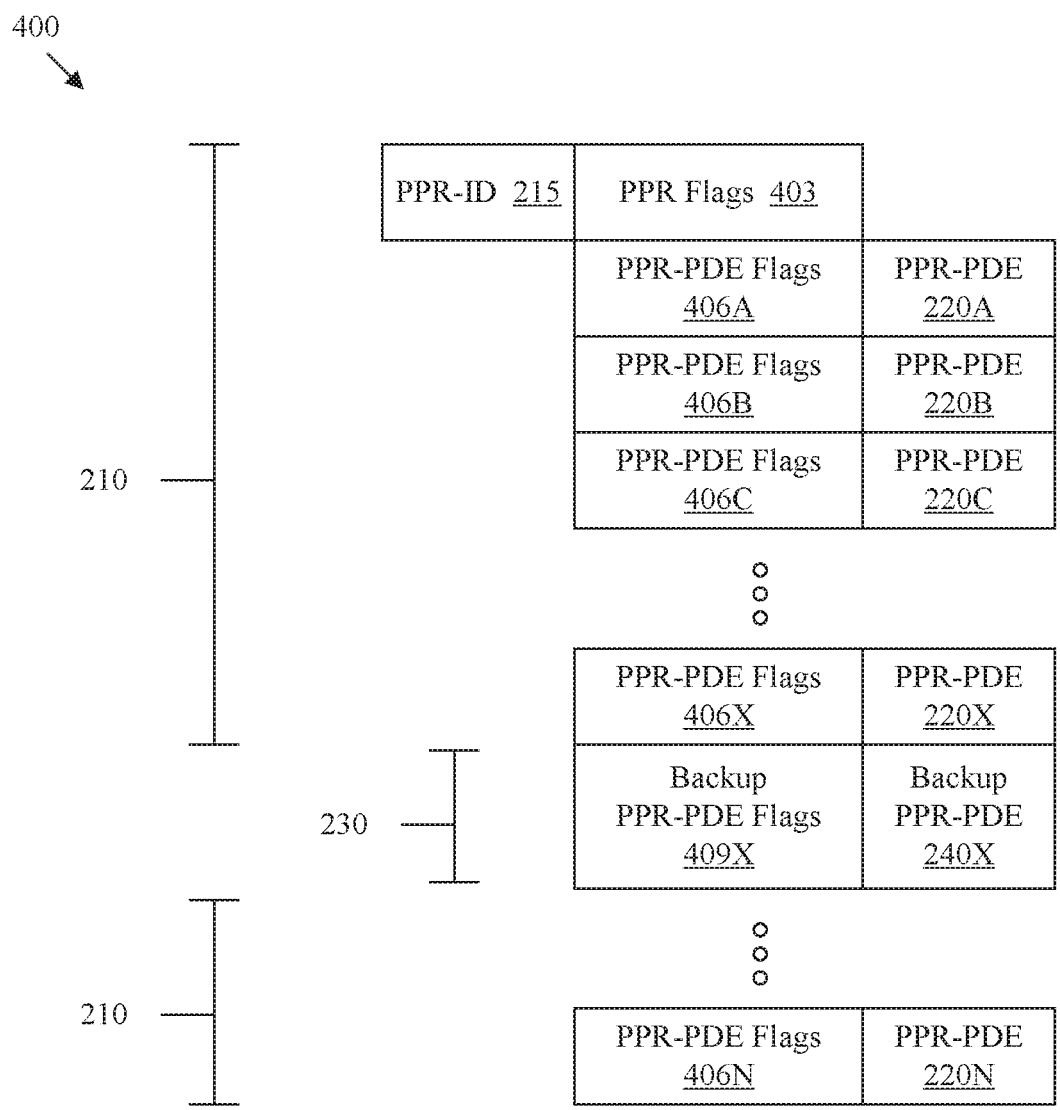
FIG. 4 is a diagram illustrating a portion of the PPR information and backup PPR information that is sent to the NEs in the network in the control plane when a backup element is used as a backup PPR according to various embodiments of the disclosure.
Figure 5:
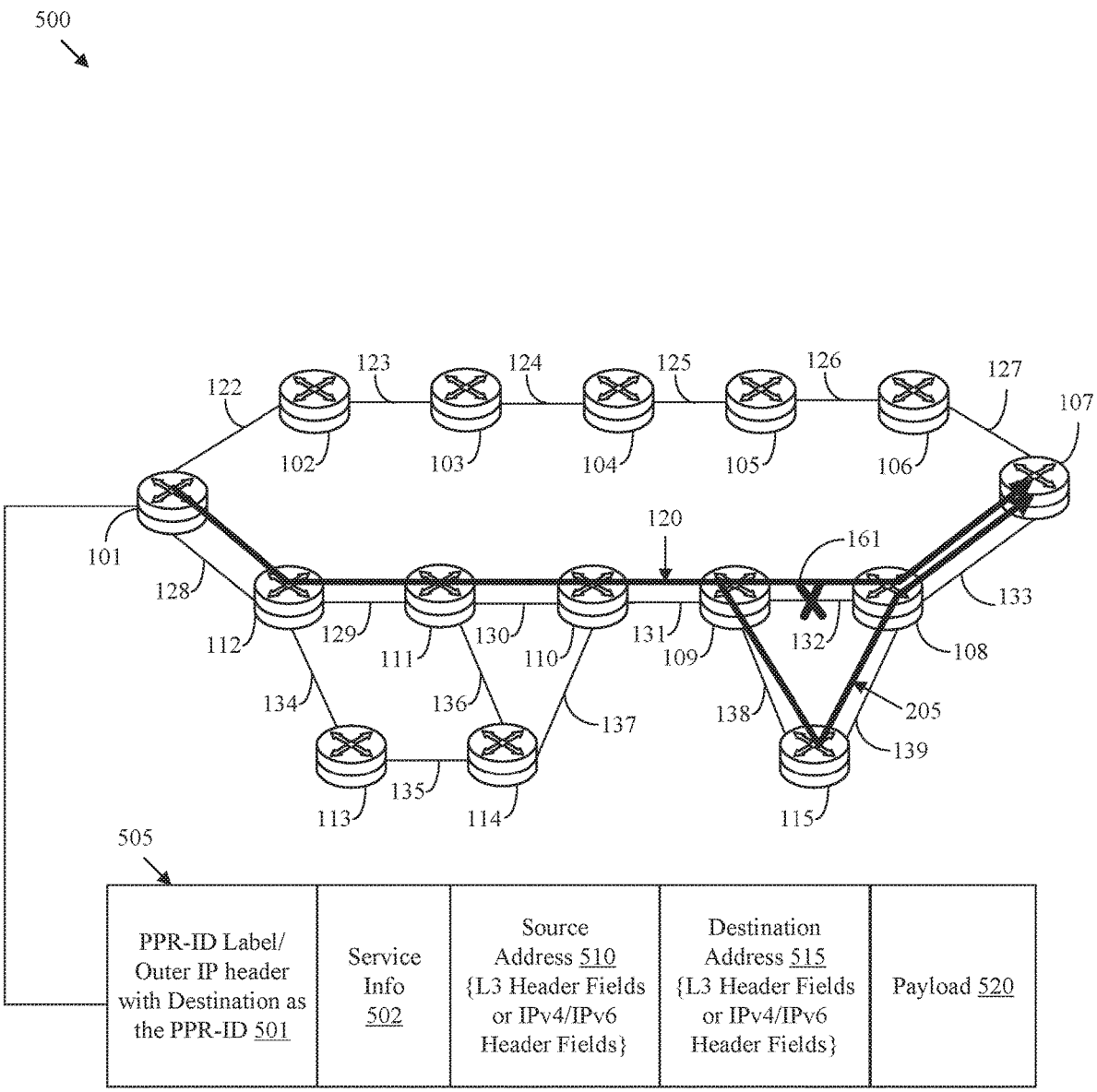
FIG. 5 is a diagram illustrating the use of a backup element in the data plane when a link along the PPR fails or is unavailable according to various embodiments of the disclosure.
Figure 6:
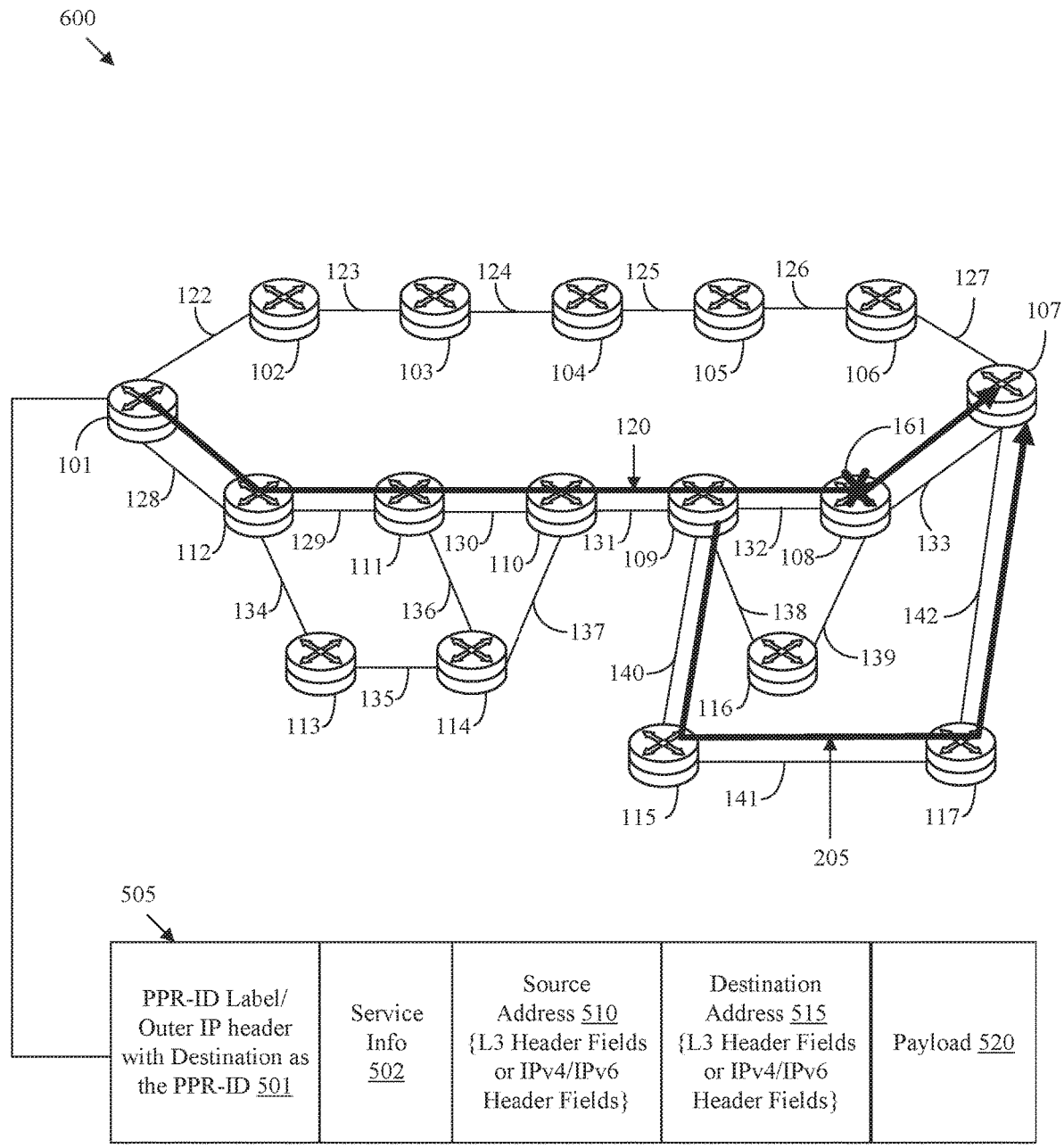
FIG. 6 is a diagram illustrating the use of a backup element in the data plane when an NE along the PPR fails or is unavailable according to various embodiments of the disclosure.
Figure 7:
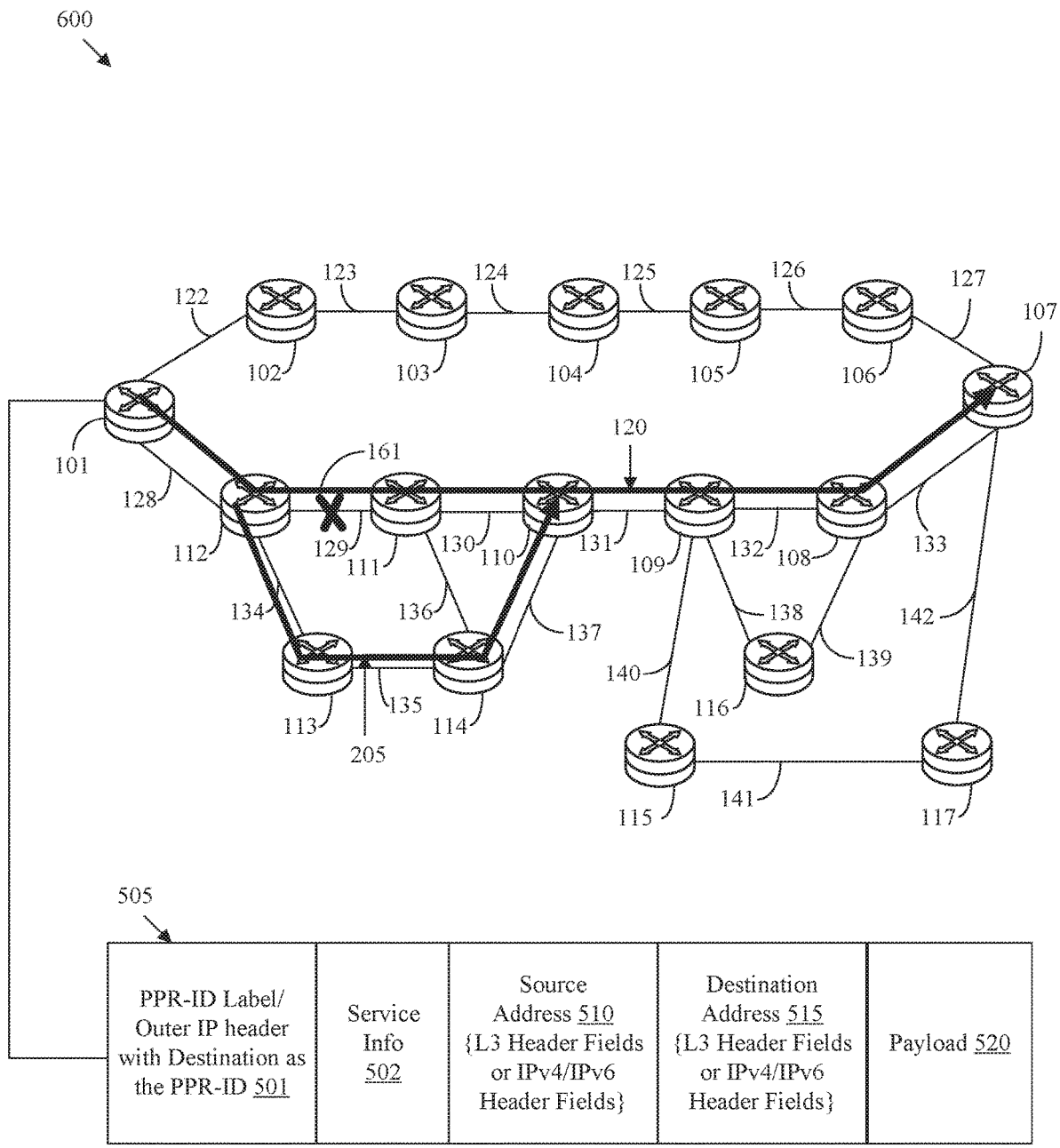
FIG. 7 is a diagram illustrating the use of a backup element in the data plane when a link along a loose PPR fails or is unavailable according to various embodiments of the disclosure.

FIGS. 4-7 are diagrams illustrating the implementation of a backup PPR 205 as a backup element according to various embodiments of the disclosure. Specifically, FIG. 4 is a diagram illustrating a portion of the PPR information 210 and backup PPR information 230 that is sent in the control plane when a backup element is used as the backup PPR 205 according to various embodiments of the disclosure. FIG. 5 is a diagram illustrating the use of a backup element in the data plane when a link along the PPR 120 fails or is unavailable. FIG. 6 is a diagram illustrating the use of a backup element in the data plane when an NE along the PPR 120 fails or is unavailable. FIG. 7 is a diagram illustrating the use of a backup element in the data plane when a link along a loose PPR 120 fails or is unavailable.

Referring now to FIG. 4, shown is a diagram of an advertisement 400 illustrating a portion of the PPR information 210 and backup PPR information 230 according to various embodiments of the disclosure. The advertisement 400 including the PPR information 210 and backup PPR information 230 is sent by the central entity 171 to the NEs 101-113 in the network 200 and flooded to the rest of the NEs 101-113 in the network 200. The backup PPR information 230 in the embodiment shown in FIG. 4 describes a backup element that is used as the backup PPR 205 when an element (e.g., NE 101, link 124, NE 104, link 125, NE 105, link 126, NE 106, link 135, NE 112, link 134, NE 111, link 133, and NE 110) on the PPR 120 fails or is otherwise unavailable.

As shown in FIG. 4, the PPR information 210 includes the PPR-ID 215, PPR-Flags 403, multiple PPR-PDEs 220A-N, and multiple PPR-PDE flags 406A-N that each correspond to a PPR-PDE 220A-N. The backup PPR information 230 includes a backup PPR-PDE 240X and a backup PPR-PDE flag 409X, which corresponds to the backup PPR-PDE 240X.

As described above, the PPR-ID 215 is a label, address, or ID that uniquely identifies the PPR 120 being described by the PPR information 210. The PPR flags 403 may include various flags that may be used to encode or decode the content of the advertisement 400. In an embodiment, the PPR flags 403 include a flag that indicates whether a destination address identified in a prefix field or destination address field corresponding to the PPR 120 is an IPv4 or IPv6 address.

In an embodiment, the PPR flags 403 include a flag that indicates whether all the NEs 101-113 in an area 150A-B of a network 200 should download the PPR information 210 and the backup PPR information 230 to the local forwarding database 343 or whether only the NEs 101-113 identified in the PPR-PDEs 220A-N or backup PPR-PDEs 240 should download the PPR information 210 and the backup PPR information 230 to the local forwarding database 343. In an embodiment, the PPR flags 403 include a flag that indicates that the advertisement 400 includes backup PPR information 230 describing a backup element should be used when a particular element on the PPR 120 fails or is unavailable.

As described above, each of the PPR-PDEs 220A-N describes an element on the PPR 120. Each of the PPR-PDEs 220A-N includes a label, address, or ID of an element, or segment consisting of multiple elements, on the PPR 120. For example, PPR-PDE 220A may include a label of NE 101 when the network 200 implements MPLS. In this example, PPR-PDE 220B may include a label of link 124. Continuing with this example, PPR-PDE 220C may include a label of a segment consisting of NE 105, link 126, and NE 106. The remaining PPR-PDEs 220D-N may also include labels, addresses, or IDs of elements or segments on the PPR 120.

Each of the PPR-PDEs 220A-N corresponds to a set of PPR-PDE flags 406A-N. A set of PPR-PDE flags 406A-N includes several different flags describing how the corresponding PPR-PDE 220A-N should be encoded, decoded, or processed. A set of PPR-PDE flags 406A-N may include a flag that indicates a type of the element identified in the corresponding PPD-PDEs 220A-N. For example, such a flag may indicate whether the element identified in the corresponding PPR-PDEs 220A-N is a topological element, a non-topological element, an NE, a link, or a segment on the PPR 120. In an embodiment, the set of PPR-PDE flags 406A-N may include a flag that, if set, indicates that the element identified in the corresponding PPD-PDEs 220A-N is loose (e.g., the element is not the direct next element on the PPR 120 being advertised). In an embodiment, the PPR-PDE flags 406A-N may include a flag that, if set, indicates that the element identified in the corresponding PPD-PDEs 220A-N is strict (e.g., the element is the direct next element on the PPR 120).

In an embodiment, the PPR-PDE flags 406A-N may include a flag that, if set, indicates that a backup element described in the backup PPR-240X should be used when the element identified in the corresponding PPD-PDEs 220A-N, or another element associated with or attached to the element identified in the corresponding PPD-PDEs 220A-N, fails or is otherwise unavailable. In an embodiment, this flag may also be used to indicate that the next PPR-PDE following the current PPR-PDE 220X is a backup PPR-PDE 240X, as shown by FIG. 4. The backup PPR-PDE 240X is similar to the PPR-PDE 220A-N, in that the backup PPR-PDE 240X carries information, such as an address, label, or ID, describing an element or segment in the network 200. However, the backup PPR-PDE 240X describes an element or segment that is not already on the PPR 120, but should be used to redirect traffic when a failure occurs on the PPR 120.

Referring back to the example described with reference to FIG. 2, the PPR information 210 may include a PPR-PDE 220X describing link 126. The PPR-PDE flag 406X, corresponding to PPR-PDE 220X describing link 126, includes a flag indicating that the next PDE is a backup PPR-PDE 240X describing an element (link 136, NE 113, and/or link 138) that should be used to redirect traffic comprising the PPR-ID 215 when link 126 fails or is unavailable.

In an embodiment, the backup PPR-PDE 240X may also be used describe a backup element when an element associated with or attached to the element identified in the corresponding PPD-PDE 240X fails or is otherwise unavailable. For example, suppose the PPR-PDE 220X describes NE 106. However, the link 126 between NE 105 and NE 106 may experience a failure 161. In this case, the PPR-PDE flag 406X, corresponding to PPR-PDE 220X describing NE 106, includes a flag indicating that the next PDE is a backup PPR-PDE 240X describing an element (link 136, NE 113, and/or link 138) that should be used to redirect traffic comprising the PPR-ID 215 when NE 106 is unavailable or cannot be reached via the PPR 120.

In this way, the advertisement 400 includes PPR information 210 describing a current active PPR 120 and backup PPR information 230 describing one or more backup elements that should be used when an element on the PPR 120 fails or unavailable. While advertisement 400 only shows one backup PPR-PDE 240X and a corresponding backup PPR-PDE flag 406X, it should be appreciated that the advertisement 400 may include any number of backup PPR-PDEs 240X for any number of PPR-PDEs 220A-N, each with corresponding backup PPR-PDE flags 406X.

Referring now to FIG. 5, shown is a diagram illustrating the use of a backup element 115 (e.g., NE 115) in the data plane when a link 132 along the PPR 120 fails or is unavailable in a network 500 according to various embodiments of the disclosure. Network 500 is similar to network 200, except that network 500 includes additional NE 115, which is similar to NEs 101-113, and an additional link 139, which are similar to links 122-138. In network 500, NEs 101-115 are interconnected by links 122-139.

The PPR 120 shown in FIG. 5 includes the following elements: ingress NE 101, link 128, NE 112, link 129, NE 111, link 130, NE 110, link 131, NE 109, link 132, NE 108, link 133, and egress NE 107. In an embodiment, a headend NE, such as NE 101, receives an advertisement 400 including PPR information 210 describing each of the elements 101, 128, 112, 129, 111, 130, 110, 131, 109, 132, 108, 133, and 107 on the PPR 120 in a respective PPR-PDE 220A-N (also referred to hereinafter as "PPR-PDE 220"). The advertisement 400 may also include backup PPR information 230, which includes a backup PPR-PDE 240X describing a backup element 115 (NE 115) toward which traffic should be redirected to when a failure 161 occurs on link 132. The advertisement 400, which includes the PPR information 210 and the backup PPR information 230, is flooded or transmitted to all the other NEs 102-115 in the network 500.

In an embodiment, a flag in the PPR flags 403 indicates that all of the NEs 101-115 in the network 500 should update the local forwarding database 343 to include the PPR information 210 and the backup PPR information 230 corresponding to the PPR-ID 215 of PPR 120. In this embodiment, all of the NEs 101-115 update the local forwarding database 343 to include the PPR information 210 and the backup PPR information 230 corresponding to the PPR-ID 215 of PPR 120. In another embodiment, a flag in the PPR flags 403 indicates that only the NEs 101, 112, 111, 110, 109, 108, and 107 identified or described in the PPR-PDEs 220 should update the local forwarding database 343 to include the PPR information 210 and the backup PPR information 230 corresponding to the PPR-ID 215 of PPR 120. In this embodiment, only the NEs 101, 112, 111, 110, 109, 108, and 107 update the local forwarding database 343 to include the PPR information 210 and the backup PPR information 230 corresponding to the PPR-ID 215 of PPR 120.

Subsequently, NEs 101-115 may receive data packets 505. The data packet 505 may include the PPR-ID 215 carried in a field 501, which may be a PPR-ID label or an outer IP header with the PPR-ID 215 carried in a destination field of the IP header (IPv4 header or IPv6 header). In an embodiment, when the data packet is encoded according to IPv4 or IPv6, the PPR-ID 215 is carried in the outer IP header 501 with the destination as the PPR-ID 215. In an embodiment in which the data packet 505 is encoded according to MPLS or SR, the data packet 505 includes the service information field 502. For MPLS, the service information field 502 includes one or more service informations. For SRv6, the service information field 502 includes one or more a SRH extension header. When the data packet is encoded with a SRH, then the data packet 505 includes an outer IPv6 header with the PPR-ID 215. In an embodiment, the service information field 502 is optional for data packets 505 being transported in an IPv4 data plane.

In some embodiments, the data packets 505 may also include a source address field 510 and a destination address field 515. The source address field 510 carries an address of the source 170 or ingress NE 101 at which data packets 505 including the PPR-ID 215 are received. The destination address field 515 carries an address of the destination 180 or the egress NE 107 toward which data packets 505 including the PPR-ID 215 are transmitted. The source address field 510 and the destination address field 515 may be Layer 3 (L3) header fields, IPv4 header fields, or IPv6 header fields. The data packet 505 in FIG. 5 does not depict the entire L3, IPv4, or IPv6 header, but instead just shows the source and destination fields within the L3, IPv4, or IPv6 header.

The data packet 505 also includes a payload field 520. The payload field 520 may include user data that should be transmitted along the PPR 120. In an embodiment, the PPR-ID field 501, source address field 510, and destination address field 515 are included in a header of the data packet 505.

During transmission of data packets 505 including the PPR-ID 215 of PPR 120 in the data plane, the failure 161 of link 132 may be detected by an adjacent NE 109 on the PPR 120. In this case, when NE 109 receives a data packet 505 comprising the PPR-ID 215, the NE 109 performs a lookup at the local forwarding database 343 for the PPR-ID 215 to determine a next hop or element toward which to forward the data packet 505. At first, the NE 109 uses the PPR-PDEs 220X to determine that the next element toward which to forward the data packet 505 is link 132. However, since link 132 is unavailable due to the failure 161, NE 109 would typically either drop the data packet 505 or retransmit the data packet 505 over an LFA path 143.

According to various embodiments, NE 109 determines that the PPR-PDE flags 406X include a flag, or bit, that is set to indicate that there is a backup PPR-PDE 240X set for the PPR-PDE 220X. The backup PPR-PDE 240X may include a label, address, or ID of the backup element 115 (NE 115). The NE 109 then accesses the backup PPR-PDE 240X in the forwarding database 343 to determine that the data packet 505 should be transmitted to NE 115 instead of across the failed link 132. NE 109 may use the forwarding database 343 and/or the link state database 351 to determine that the data packet 505 may be transmitted to NE 115 via link 138.

Once NE 115 receives the data packet, a determination of how to continue forwarding the data packet 505 is based on whether all of the NEs 101-115 in the network 500 stores the PPR information 210 and the backup PPR information 230. In an embodiment in which the PPR flags 403 includes a flag indicating that all NEs 101-115 in the network 500 should store the PPR information 210 and the backup PPR information 230, then the NE 115 stores an entry 345 in the forwarding database 343 corresponding to a destination address 515 of the egress NE 107 that includes the PPR information 210 and the backup PPR information 230. In this case, NE 115 may perform a lookup at the local forwarding database 343 to determine that the data packet 505 should be transmitted through link 139 to reach NE 108, such that the data packet 505 can be transmitted back along the PPR 120 to reach the egress NE 107.

In an embodiment in which a flag in the PPR flags 403 indicates that only the NEs 101, 113, 112, 110, 109, 108, and 107 identified or described in the PPR-PDEs 220 should update the local forwarding database 343, then NE 115 does not store an entry 345 in the forwarding database 343 including the PPR information 210 and the backup PPR information 230. In this case, NE 115 is configured to forward the data packet 505 along the shortest path 145 between NE 115 and egress NE 107, which is the example shown in FIG. 5, and follows along the backup PPR 205. In this embodiment, transmitting the data packet 505 through the backup PPR 205, which includes transmitting the data packet 505 through link 138 and NE 115 to avoid link 132, and transmitting the data packet 505 through link 139 back to NE 108 on the PPR 120 is the optimal way to transmit the data packet 505 according to the attributes 225 that may have been defined for the PPR 120.

Referring now to FIG. 6, shown is a diagram illustrating the use of a backup element (e.g., NE 115) in the data plane when an NE along the PPR 120 fails or is unavailable in a network 600 according to various embodiments of the disclosure. The diagram shown in FIG. 6 is similar to FIG. 5, except that instead of showing how the data packet 505 is redirected upon a failure 161 of the link 132 on the PPR 120, FIG. 6 illustrates how the data packet 505 is redirected upon a failure 161 of an NE 108 on the PPR 120. Network 600 is similar to network 500, except that network 600 includes additional NEs 116-117, which are similar to NEs 101-115, and links 140-142, which are similar to links 122-139.

In an embodiment, NE 109 stores a PPR-PDE 220X indicating a next element (NE 108) along which to forward a data packet 505 including the PPR-ID 215. The PPR-PDE flags 406X includes a flag indicating that a backup PPR-PDE 240X has been set for a PPR-PDE 220X. The backup PPR-PDE 240X indicates a backup element (NE 115) that traffic should be redirected to when the next element (NE 108) indicated by the PPR-PDE 220X has failed or is unavailable.

In this case, when NE 109 receives a data packet 505 including the PPR-ID 215, NE 109 first uses the PPR-PDE 220X to determine the next element (NE 108) along which to forward the data packet. When the next element (NE 108) is determined as being unavailable, NE 109 determines whether a flag in the corresponding PPR-PDE flags 406X indicates that a backup element (NE 115) has been set for the next element (NE 108). If so, NE 109 obtains the label, address, or identifier of the backup element (NE 115) and forwards the data packet 505 to NE 115 via link 140 and through the backup PPR 205.

As described above, once NE 115 receives the data packet, NE 115 transmits the data packet 505 along the backup PPR 205, through link 141, NE 117, link 142, and egress NE 107. In an embodiment, NE 115 transmits the data packet 505 along a backup PPR 205 in a manner such that the data packet 505 converges back onto the PPR 120 and avoids the failure 161 at NE 109 only when the NE 115 stores the PPR information. Otherwise, NE 115 transmits the data packet 505 to the egress NE 107 using the shortest path 145, which in this case is also the backup PPR 205, between NE 115 and the egress NE 107.

Referring now to FIG. 7, shown is a diagram illustrating the use of a backup element (e.g., NE 113) in the data plane when a link along a loose PPR 120 fails or is unavailable in a network 600 according to various embodiments of the disclosure. The diagram shown in FIG. 7 is similar to FIG. 6, except that instead of showing how the data packet 505 is redirected upon a failure 161 of the NE 108 on a strict PPR 120, FIG. 7 illustrates how the data packet 505 is redirected upon a failure 161 of a link 129 on a loose PPR 120.

As described above, a loose PPR 120 is one in which only a subset of elements on the PPR 120 are defined in the PPR-PDEs 220 of the PPR information 210. For example, the PPR 120 described above with reference to FIGS. 4-6 includes the following elements: NE 101, link 128, NE 112, link 129, NE 111, link 130, NE 110, link 131, NE 109, link 132, NE 108, link 133, and NE 107. A strict PPR 120 would include a PPR-PDE 220 for at least each of the NEs 101, 112, 111, 110, 109, 108, and 107 on the PPR 120. However, a loose PPR 120 would only include PPR-PDEs 220 for a subset of the NEs 101, 112, 110, 109, 108, and 107 on the PPR 120.

For example, suppose that for the loose PPR 120 shown in FIG. 7, the PPR information 210 includes a PPR-PDE 220 for NE 101, NE 112, NE 110, NE 109, NE 108, and NE 107. In this way, the PPR information 210 for PPR 120 does not include a PPR-PDE 220 for NE 111. Therefore, only a subset of the NEs 101, 112, 110, 109, 108, and 107 on the PPR 120 are described in the PPR-PDEs 220 of the PPR information 210.

In addition, suppose that at least one of the NEs 101, 112, 110, 109, 108, and 107 in network 600 stores backup PPR information 230 for PPR 120, in which the backup PPR information 230 includes a backup PPR-PDE 240X describing the backup element (NE 1113), toward which traffic should be redirected when NE 110 on the PPR 120 cannot be reached or is unavailable. In this case, when a data packet 505 is received at NE 112, NE 112 first performs a lookup at the local forwarding database 343 to determine a PPR-PDE 220X corresponding to a next loose element (NE 110) toward which to forward the data packet 505. Next, NE 112 may determine that an element (link 129) between NE 112 and 110 has experienced a failure 161. In this case, NE 112 determines whether the PPR-PDE flags 406X corresponding to the PPR-PDE 220X indicates that a backup PPR-PDE 240X has been defined for the PPR-PDE 220X. If so, the NE 112 obtains the backup PPR-PDE 240X corresponding to the backup element (NE 113) along which to redirect the data packet 505 with the PPR-ID 215.

In some embodiments, loose PPRs 120 may only be defined for networks 600 that implement MPLS. In this case, the data packet 505 may include a bottom label including the PPR-ID 215 of PPR 120. For networks implementing MPLS, upon identifying the backup PPR-PDE 240X corresponding to the backup element (NE 114) along which to redirect the data packet 505 with the PPR-ID 215, NE 112 adds a top label on top of the bottom label including the address, label, or identifier of backup element (NE 113). NE 112 then forwards the data packet 505 to NE 113. NE 113 first pops off the top label and then extracts the PPR-ID 215 from the bottom label of the data packet. For networks implementing IPv4 or IPv6, the PPR-ID 215 is carried in the destination address field 515 of an IPv4 or IPv6 header. In this case, the data packet 505 is encapsulated again with the destination address field 515 set to NE 113. NE 114 may then remove the outer header and continue forwarding based on the PPR-ID 215 as before.

In an embodiment, if the NE 113 stores the PPR information 210 corresponding to the PPR-ID 215 in the forwarding database 343, then NE 113 identifies the next element on the PPR 120 as NE 110 and forwards the data packet 505 along the backup PPR 205, which includes forwarding the data packet 505 to NE 110 via link 135, NE 114, and link 137 to NE 110. The path between NE 113 to NE 110 in this case is also the shortest path 145 between NE 113 and NE 110. In this embodiment, transporting the data packet 505 through the backup PPR 205 when a failure 161 occurs on the original PPR 120 enables the data packet 505 to be transported while satisfying substantially the same attributes 225 designated for the original PPR 120. In an embodiment, if the NE 113 does not store the PPR information 210 corresponding to the PPR-ID 215 in the forwarding database 343, then NE 113 forwards the data packet 505 to the egress NE 107 along the shortest path 145 between NE 113 and egress NE 107.

Figure 8:
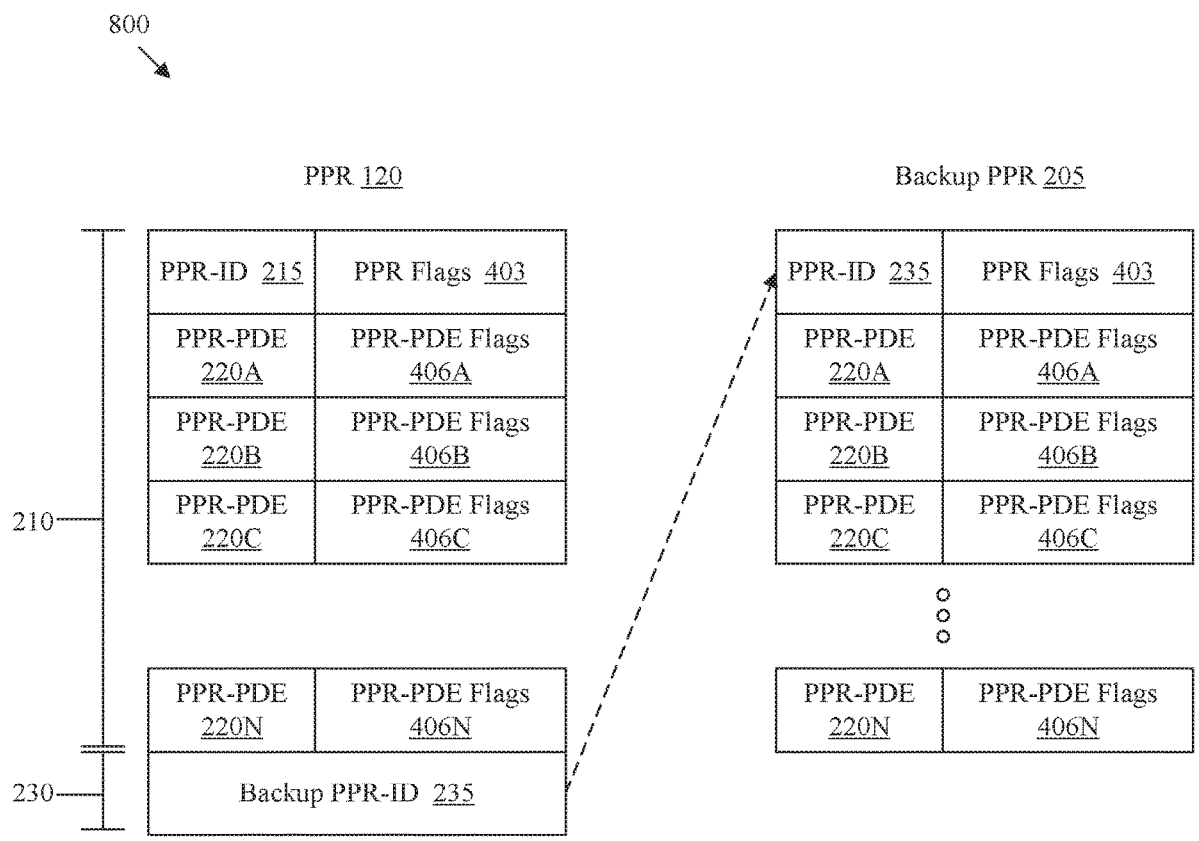
FIG. 8 is a diagram illustrating a portion of the PPR information and backup PPR information that is sent to the NEs in the network in the control plane when a backup end-to-end PPR is used as the backup PPR according to various embodiments of the disclosure.
Figure 9:
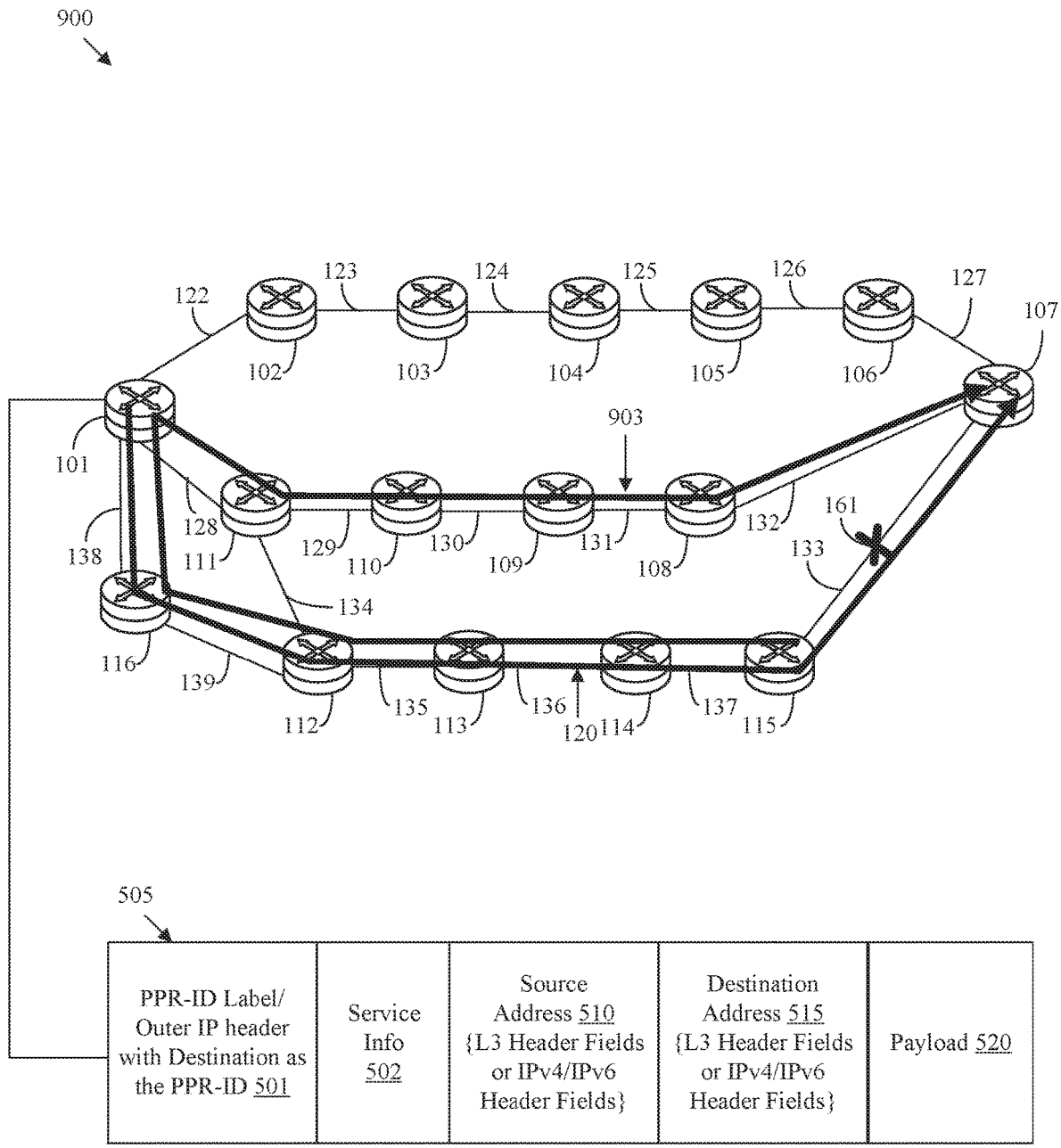
FIG. 9 is a diagram illustrating the use of a backup end-to-end PPR in the data plane when an element along the PPR fails or is unavailable according to various embodiments of the disclosure.

Referring now to FIGS. 8-9, shown are diagrams illustrating the implementation of a backup PPR 205 as a backup end-to-end PPR according to various embodiments of the disclosure. Specifically, FIG. 8 is a diagram illustrating a portion of the PPR information 210 and backup PPR information 230 that is sent in the control plane when a backup end-to-end PPR is used as the backup PPR 205. FIG. 9 is a diagram illustrating the use of a backup end-to-end PPR in the data plane when an element along the PPR 120 fails or is unavailable.

Referring now to FIG. 8, shown is an advertisement 800 illustrating a portion of the PPR information 210 and backup PPR information 230 according to various embodiments of the disclosure. Advertisement 800 is similar to advertisement 400 in that advertisement 800 is also sent from the central entity 171 to a headend NE 101-112 (see FIG. 2) in network 200 (see FIG. 2), and then flooded to all the other NEs 101-113 in the network 200. However, unlike advertisement 400 in which the backup PPR 205 is advertised as a backup PPR-PDE 240X, advertisement 800 includes a backup PPR 205 advertised as a backup PPR-ID 235.

Advertisement 800 includes the PPR information 210, such as the PPR-ID 215, the PPR flags 403, PPR-PDEs 220A-N, and corresponding PPR-PDE flags 406A-N. Advertisement 800 also includes the backup PPR information 230. In the embodiment shown in FIG. 8, the backup PPR information 230 includes a backup PPR-ID 235, which is a label, address, or identifier of a backup PPR 205 implemented as a backup end-to-end PPR. A backup end-to-end PPR refers to another PPR 120 already established in the network 200. As shown by FIG. 8, the backup PPR 205 corresponds to another set of PPR flags 403, PPR-PDEs 220A-N, and corresponding PPR-PDE flags 406A-N. One or more NEs 101-113 in the network 200 may store an entry 345 in a local forwarding database 343 with PPR-PDEs 220A-N for the backup PPR 205.

Referring now to FIG. 9, shown is a diagram illustrating the use of a backup end-to-end PPR 903 as the backup PPR 205 in the data plane when an element 133 (e.g., link 133) along the PPR 120 fails or is unavailable in a network 900 according to various embodiments of the disclosure. Network 900 is similar to network 200 in that network 900 includes NEs 101-116 interconnected by links 122-139. The PPR 120 shown in FIG. 9 includes the following elements: ingress NE 101, link 138, NE 116, link 139, NE 112, link 135, NE 113, link 136, NE 114, link 137, NE 115, link 133, and egress NE 107. As described above, a headend NE, such as NE 102, in network 900 receives an advertisement 800 including PPR information 210 describing each of the elements 101, 138, 116, 139, 112, 135, 113, 136, 114, 137, 115, 133, and 107 on the PPR 120 in a respective PPR-PDE 220A-N.

The advertisement 800 may also include backup PPR information 230, which includes a backup PPR-ID 235 identifying the backup end-to-end PPR 903. As shown by FIG. 9, the backup end-to-end PPR 903 includes the following elements: ingress NE 115, link 137, NE 114, link 136, NE 113, link 135, NE 112, link 139, NE 116, link 138, NE 101, link 128, NE 111, link 129, NE 110, link 130, NE 109, link 131, NE 108, link 132, and egress NE 107. In an embodiment, one or more of the NEs 101-116 in the network 900 includes an entry 345 in the local forwarding database 343 with one or more PPR-PDEs 220 corresponding to one or more of the elements on the backup end-to-end PPR 903. The NEs 101-116 may have received and stored the PPR-PDEs 220 for the backup end-to-end PPR 903 at a previous time when the PPR-PDEs 220 for the backup end-to-end PPR 903 were being advertised as a regular PPR 120.

In an embodiment, one or more of the NEs 101-116 in network 900 updates the local forwarding database 343 to include the PPR information 210 and the backup PPR information 230. As described above, in one embodiment, all of the NEs 101-116 in the network 900 update the local forwarding database 343 to include the PPR information 210 and the backup PPR information 230. In another embodiment, only the elements identified in the PPR-PDEs 220 corresponding to the PPR-ID 215 and/or the backup PPR-ID 235 updates the local forwarding database 343 to include the PPR information 210 and the backup PPR information 230.

Subsequently, during transmission of data packets 505 including the PPR-ID 215, the failure of link 133 along the PPR 120 may be detected by an adjacent NE 115. In this case, when NE 115 receives a data packet 505 comprising the PPR-ID 215, the NE 115 performs a lookup at the local forwarding database 343 for the PPR-ID 215 to determine a next hop or element toward which to forward the data packet. At first, the NE 115 uses the PPR-PDEs 220X to determine that the next element toward which to forward the data packet 505 is link 133. However, since link 133 is unavailable due to the failure 161, NE 109 would typically either drop the data packet 505 or retransmit the data packet 505 over an LFA path 143.

According to various embodiments, NE 115 determines that the PPR flags 403, or at least one of the PPR-PDE flags 406A-N, include a flag that is set to indicate that there is a backup PPR-ID 235 corresponding to the backup end-to-end PPR 903 set for the PPR-ID 215, corresponding to the PPR 120. The backup PPR-ID 235 may include a label, address, or identifier of the backup end-to-end PPR 903. The NE 109 then obtains the backup PPR-ID 235 and performs another lookup at the local forwarding database 343 for the PPR-PDEs 220 corresponding to the backup PPR-ID 235. The PPR-PDEs 220 corresponding to the backup PPR-ID 235 indicates a backup PPR 205 along which to redirect the data packet 505 including the PPR-ID 215. NE 115 then redirects the data packet 505 back through link 137 based on the PPR-PDEs 220 corresponding to the backup PPR-ID 235 to avoid link 133. In this embodiment, transmitting the data packet 505 through the end-to-end backup PPR 903 while avoiding transmitting the data packet 505 through link 133 is the optimal way to transmit the data packet 505 according to substantially the same the attributes 225 that may have been defined for the PPR 120.

Figure 10:
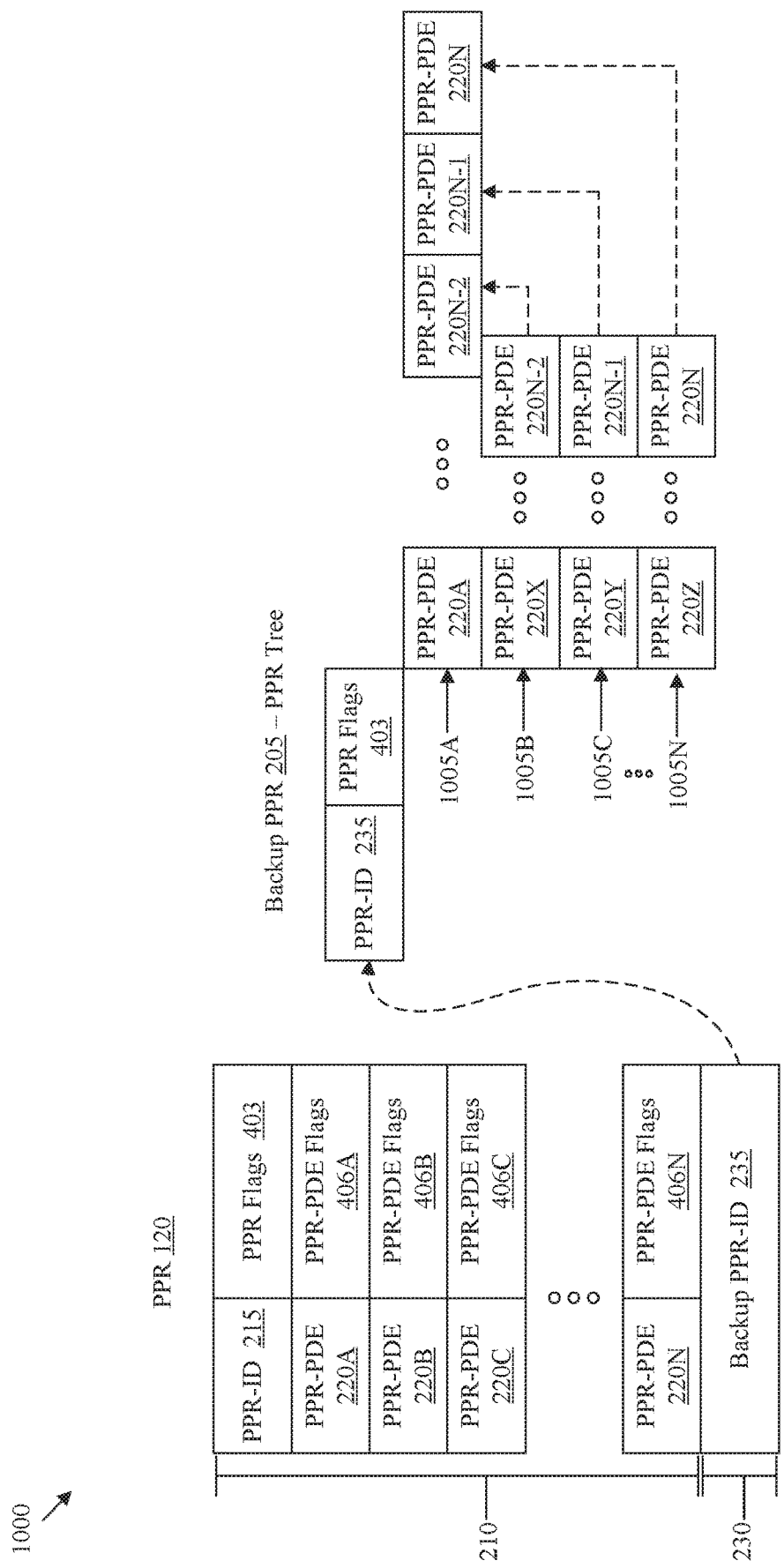
FIG. 10 is a diagram illustrating a portion of the PPR information and backup PPR information that is sent to the NEs in a network in the control plane when a backup end-to-end PPR tree is used as the backup PPR according to various embodiments of the disclosure.
Figure 11:
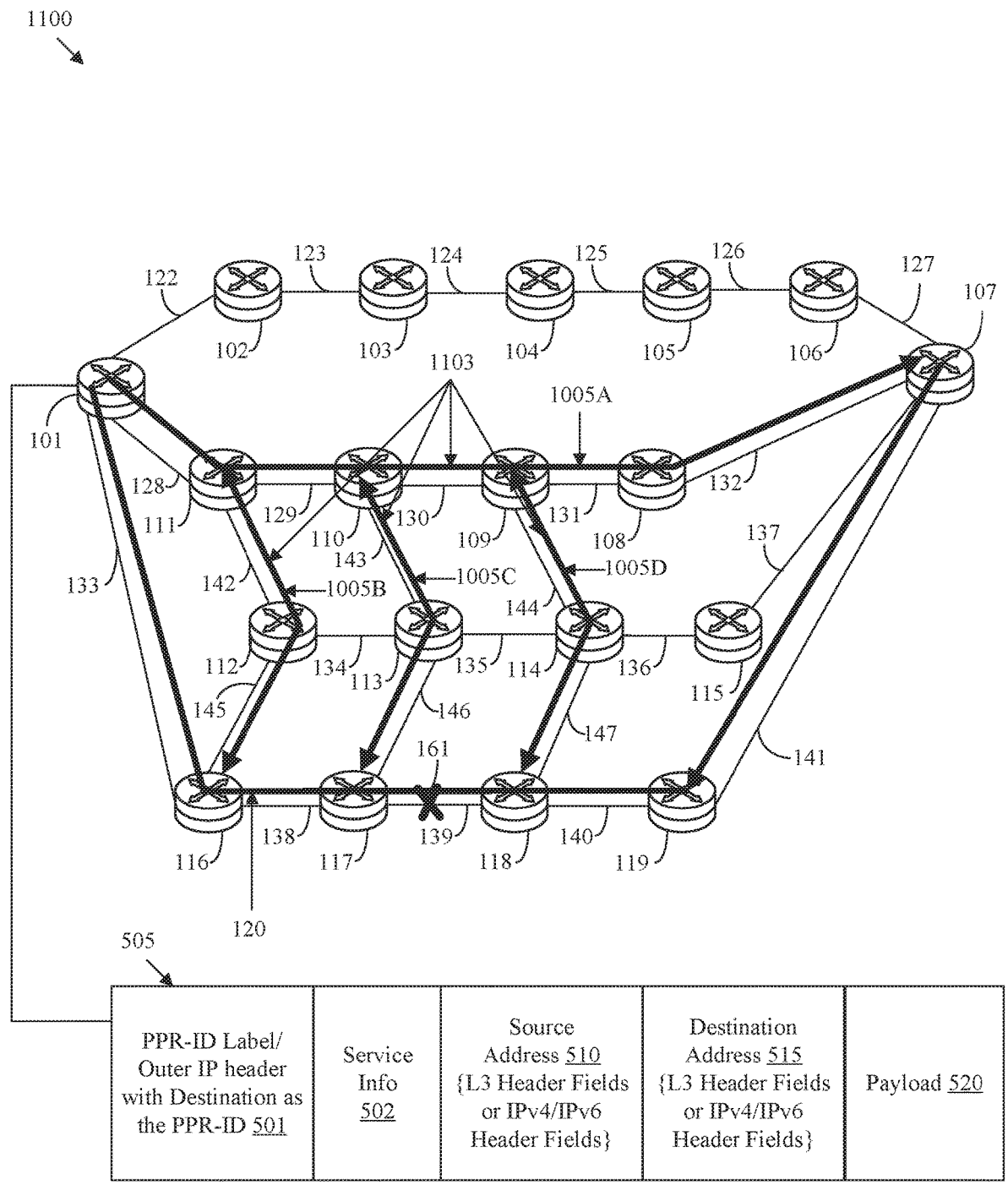
FIG. 11 is a diagram illustrating the use of a backup end-to-end PPR tree in the data plane when an element along the PPR fails or is unavailable according to various embodiments of the disclosure.

Referring now to FIGS. 10-11, shown are diagrams illustrating the implementation of a backup PPR 205 as a backup end-to-end PPR tree according to various embodiments of the disclosure. Specifically, FIG. 10 is a diagram illustrating a portion of the PPR information 210 and backup PPR information 230 that is sent in the control plane when a backup end-to-end PPR tree is used as the backup PPR 205. FIG. 11 is a diagram illustrating the use of a backup end-to-end PPR tree in the data plane when an element along the PPR 120 fails or is unavailable.

Referring now to FIG. 10, shown is an advertisement 1000 illustrating a portion of the PPR information 210 and backup PPR information 230 according to various embodiments of the disclosure. Advertisement 1000 is similar to advertisements 400 and 800 in that advertisement 1000 is also sent from the central entity 171 to a headend NE 101-112 (see FIG. 2) in network 200 (see FIG. 2), and then flooded to all the other NEs 101-113 in the network 200. However, unlike advertisement 400 and 800, advertisement 1000 includes a backup PPR 205 advertised as a backup end-to-end PPR tree with a backup PPR-ID 235.

Similar to advertisements 400 and 800, advertisement 1000 includes PPR information 210, such as the PPR-ID 215, the PPR flags 403, PPR-PDEs 220A-N, and corresponding PPR-PDE flags 406A-N. Advertisement 1000 also includes backup PPR information 230, which in this embodiment, includes a backup PPR-ID 235 of a backup PPR 205 implemented as a backup end-to-end PPR tree. The backup PPR-ID 235 corresponds to another PPR 120 implemented as a backup end-to-end PPR tree already established in the network 200.

As shown by FIG. 10, the backup PPR 205 implemented as a backup end-to-end PPR tree is associated with the backup PPR-ID 235 and another set of PPR flags 403. In an embodiment, the backup PPR 205 implemented as a backup end-to-end PPR tree includes multiple branches 1005A-N of PPR-PDEs 220A-N and 220X-Z. In an embodiment, each of the multiple branches 1005A-N on the backup end-to-end PPR extends from another NE that is not part of a primary branch 1005A of the backup end-to-end PPR tree to an intermediary NE on the primary branch 1005A of the backup end-to-end PPR tree.

Referring back to the PPR 120 shown in FIG. 2, a primary branch 1005A may be a first end-to-end PPR established between an ingress NE 101 and an egress NE 110. The PPR-PDEs 220A-N for branch 1005A describes or identifies one or more elements on the first end-to-end PPR established between an ingress NE 101 and an egress NE 110 (as shown in FIG. 2). For example, PPR-PDE 220A includes an address, label, or ID of ingress NE 101, PPR-PDE 220N-2 includes an address, label or ID of NE 112, PPR-PDE 220N-1 includes an address, label, or ID of NE 111, and PPR-PDE 220N includes an address, label, or ID of egress NE 107.

One or more secondary branches 1005B-N extend from another NE that is not part of the primary branch 1005A of the backup end-to-end PPR tree to an intermediary NE on a primary branch 1005A of the backup end-to-end PPR tree. For example, branch 1005B may be a PPR 120 extending from an element that is not part of the primary branch 1005A to the NE 112. In an embodiment, each of the PPR-PDEs 220X to 220N-2 for branch 1005B includes an address, label, or ID of an element on the branch 1005B. As another example of a branch in a backup end-to-end PPR tree, branch 1005C may be a PPR 120 extending from an element that is not part of the primary branch 1005A to the NE 111. In an embodiment, each of the PPR-PDEs 220X to 220N-1 for branch 1005C includes an address, label, or ID of an element on the branch 1005C. As yet another example of a branch in a backup end-to-end PPR tree, branch 1005N may be a PPR 120 extending from an element that is not part of the primary branch 1005A to the NE 107. In an embodiment, each of the PPR-PDEs 220X to 220N for branch 1005N includes an address, label, or ID of an element on the branch 1005N.

One or more NEs 101-113 (see FIG. 2) in network 200 may store an entry 345 in a local forwarding database 343 with the PPR information 210 and the backup PPR information 230 after receiving the advertisement 1000. Prior to receiving the advertisement 1000, the one or more NEs 101-113 (see FIG. 2) may already store the PPR-PDEs 220A-N and 220X-Z for each of the branches 1005A-N corresponding to the backup PPR 205 implemented as a backup end-to-end PPR tree. While not shown in FIG. 10, each of the PPR-PDEs 220A-N and 220X-Z may also be stored at the local forwarding database 343 of one or more NEs 101-113 (see FIG. 2) in association with a set of PPR-PDE flags 406A-N.

Referring now to FIG. 11, shown is a diagram illustrating the use of a backup PPR 205 implemented as a backup end-to-end PPR tree 1103 in the data plane when an element (e.g., link 139) along the PPR 120 fails or is unavailable in a network 1100 according to various embodiments of the disclosure. Network 1100 is similar to network 200 in that network 1100 includes NEs 101-119, which are similar to NEs 101-113 (see FIG. 2) of network 200 (see FIG. 2). NEs 101-119 in network 1100 are interconnected by links 122-147, which are similar to links 122-138 of network 200. The PPR 120 shown in FIG. 11 includes the following elements: ingress NE 101, link 133, NE 116, link 138, NE 117, link 139, NE 118, link 140, NE 119, link 141, and egress NE 107. As described above, a headend NE, such as NE 102, in network 1100 receives an advertisement 1000 including PPR information 210 describing each of the elements 101, 133, 116, 138, 117, 139, 118, 140, 119, 141, and 107 on the PPR 120 in a respective PPR-PDE 220A-N.

The advertisement 1000 also includes backup PPR information 230, which includes a backup PPR-ID 235 identifying the backup end-to-end PPR tree 1103. As shown by FIG. 11, the backup end-to-end PPR tree 1103 includes a primary branch 1005A and three secondary branches 1005B-D. The primary branch 1005A includes the following elements: ingress NE 101, link 128, NE 111, link 129, NE 110, link 130, NE 109, link 131, NE 109, link 132, and egress NE 107. The secondary branch 1005B extends from NE 116, which is not part of the primary branch 1005A, to NE 111, which is part of the primary branch 1005A, via link 145, NE 112, and link 142. Therefore, the PPR-PDEs 220A-N and 220X-Z for branch 1005B each includes an address, label, or ID of NE 116, link 145, NE 112, link 142, and NE 111. The secondary branch 1005C extends from NE 117, which is not part of the primary branch 1005A, to NE 110, which is part of the primary branch 1005A, via link 146, NE 113, and link 143. Therefore, the PPR-PDEs 220A-N and 220X-Z for branch 1005C each includes an address, label, or ID of NE 117, link 146, NE 112, link 143, and NE 110. The secondary branch 100DC extends from NE 118, which is not part of the primary branch 1005A, to NE 109, which is part of the primary branch 1005A, via link 147, NE 114, and link 144. Therefore, the PPR-PDEs 220A-N and 220X-Z for branch 1005D each includes an address, label, or ID of NE 118, link 147, NE 114, link 144, and NE 109.

In an embodiment, one or more NEs 101-119 already stores PPR-PDEs 220A-N and 220X-Z for the backup PPR-ID 235 identifying the backup end-to-end PPR tree 1103 in a local forwarding database 343. Subsequently, during transmission of data packets 505 including the PPR-ID 215, the failure 161 of link 139 along the PPR 120 may be detected by an adjacent NE 117. In this case, when NE 117 receives a data packet 505 comprising the PPR-ID 215, the NE 117 performs a lookup at the local forwarding database 343 for the PPR-ID 215 to determine a next hop or element toward which to forward the data packet 505. At first, the NE 117 uses the PPR-PDEs 220X to determine that the next element toward which to forward the data packet 505 is link 139. However, since link 139 is unavailable due to the failure 161, NE 117 would typically either drop the data packet 505 or retransmit the data packet 505 over an LFA path 143.

According to various embodiments, NE 117 determines that the PPR flags 403, or at least one of the PPR-PDE flags 406A-N, include a flag that is set to indicate that there is a backup PPR-ID 235 corresponding to the backup end-to-end PPR tree 1103 set for the PPR-ID 215 corresponding to the PPR 120. The backup PPR-ID 235 may include a label, address, or identifier of the backup end-to-end PPR tree 1103. The NE 117 then obtains the backup PPR-ID 235 and performs another lookup at the local forwarding database 343 for the PPR-PDEs 220A-N and 220X-Z corresponding to the backup PPR-ID 235. The PPR-PDEs 220A-N and 220X-Z include multiple branches 1005A-D that indicate various different routes by which to direct the data packet 505 along one of the branches 1005A-D when a failure 161 is detected on the PPR 120. When the failure 161 is detected at link 139, NE 117 may use the PPR-PDEs 220A-N and 220X-Z corresponding to branch 1005C to redirect the data packet 505 along the backup end-to-end PPR tree 1103 and avoid link 139. In particular, NE 117 redirects the data packet 505 to NE 113 via link 146. NE 113 and the remaining NEs on the backup end-to-end PPR tree 1103 may use the forwarding database 343 with the backup PPR-ID 235 to determine next elements along which to forward the data packet 505 until the data packet 505 reaches egress NE 107. In this embodiment, transmitting the data packet 505 through the backup PPR 205 (backup end-to-end PPR tree 1103) while avoiding transmitting the data packet 505 through link 139 is the optimal way to transmit the data packet 505 according to the attributes 225 that may have been defined for the PPR 120.

Figure 12:
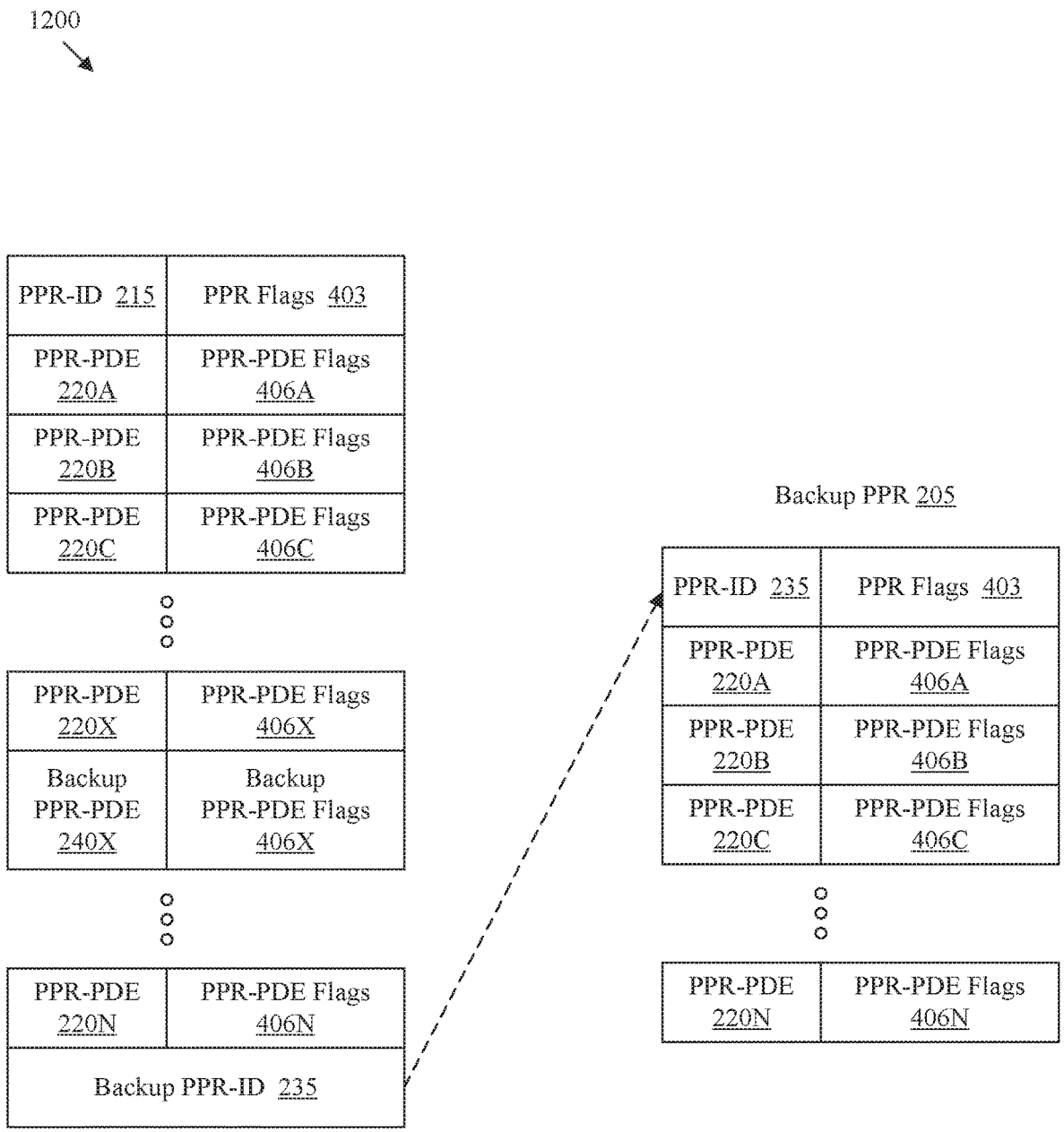
FIG. 12 is a diagram illustrating a portion of the PPR information and backup PPR information that is sent to the NEs in the network in the control plane when both a backup element and a backup end-to-end PPR is used as the backup PPR according to various embodiments of the disclosure.
Figure 13:
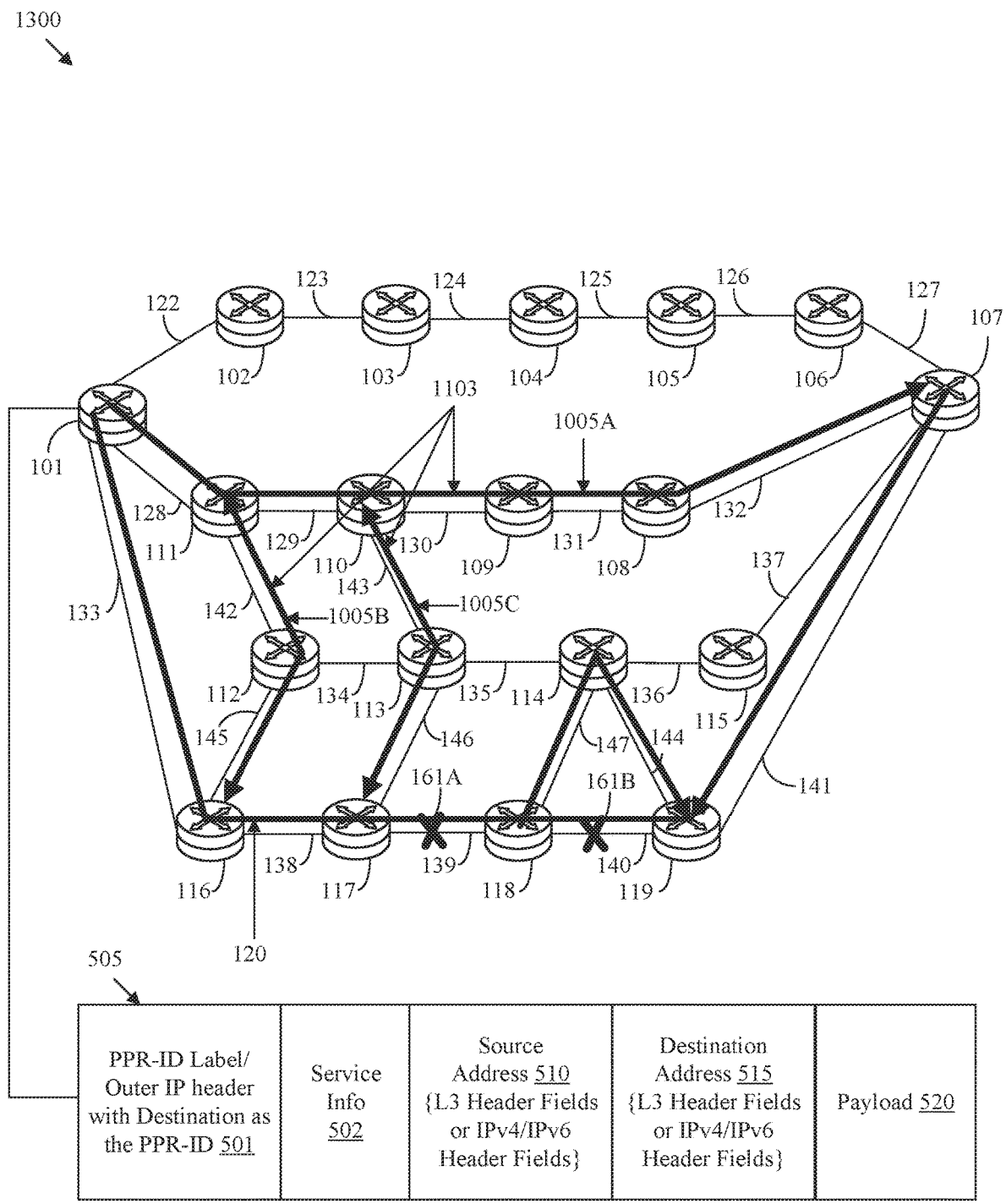
FIG. 13 is a diagram illustrating the use of both a backup element and a backup end-to-end PPR in the data plane when an element along the PPR fails or is unavailable according to various embodiments of the disclosure.

Referring now to FIGS. 12-13, shown are diagrams illustrating the implementation of a backup PPR 205 as both a backup element and a backup end-to-end PPR according to various embodiments of the disclosure. Specifically, FIG. 12 is a diagram illustrating a portion of the PPR information 210 and backup PPR information 230 that is sent to the NEs in the network 200 in the control plane when both a backup element and a backup end-to-end PPR is used as the backup PPR 205. FIG. 13 is a diagram illustrating the use of both a backup element and a backup end-to-end PPR in the data plane when an element along the PPR 120 fails or is unavailable.

Referring now to FIG. 12, shown is advertisement 1200 illustrating a portion of the PPR information 210 and backup PPR information 230 according to various embodiments of the disclosure. Advertisement 1200 is similar to advertisements 400, 800, and 1000 in that advertisement 1200 is also sent from the central entity 171 to a headend NE 101-112

(see FIG. 2) in network 200 (see FIG. 2), and then flooded to all the other NEs 101-113 in the network 200. However, unlike advertisements 400, 800, and 1000, advertisement 1200 includes a backup PPR 205 advertised as both a backup element with a backup PPR-PDE 240X and a backup end-to-end PPR with a backup PPR-ID 235.

Similar to advertisement 400, advertisement 1200 includes a backup PPR-PDE 240X describing a backup element toward which to redirect traffic to when the traffic cannot be properly transmitted to the element described by PPR-PDE 220X due to a failure 161 occurring along the PPR 120. However, the backup element described by the backup PPR-PDE 240X can only be used when the particular element described by PPR-PDE 220X is unavailable. When other elements along the PPR 120, other than the particular element described by PPR-PDE 220X, are unavailable, traffic may be redirected to the backup end-to-end PPR identified by the backup PPR-ID 235 included in advertisement 1200. The backup PPR-ID 235 may identify a backup end-to-end PPR or a backup an end-to-end PPR tree. The example shown in FIG. 12 shows the backup PPR-ID 235 identifying a backup end-to-end PPR. As shown by FIG. 12, the backup PPR-ID 235 is associated with PPR flags 403, multiple PPR-PDEs 220A-N, and corresponding PPR-PDE flags 406A-N.

Referring now to FIG. 13, shown is a diagram illustrating the use of a backup PPR 205 implemented as both a backup element 114 and backup end-to-end PPR tree 1103 in the data plane when an element (e.g., link 139 or 140) along the PPR 120 fails or is unavailable in a network 1300 according to various embodiments of the disclosure. Network 1300 is similar to network 1100 in that network 1300 also includes NEs 101-119 interconnected by links 122-147. The PPR 120 shown in FIG. 13 includes the following elements: ingress NE 101, link 133, NE 116, link 138, NE 117, link 139, NE 118, link 140, NE 119, link 141, and egress NE 107. As described above, a headend NE, such as NE 102, in network 1300 receives an advertisement 1200 including PPR information 210 describing each of the elements 101, 133, 116, 138, 117, 139, 118, 140, 119, 141, and 107 on the PPR 120 in a respective PPR-PDE 220A-N.

The received advertisement 1200 also includes backup PPR information 230, which in this embodiment, includes both a backup PPR-ID 235 identifying the backup end-to-end PPR tree 1103 and a backup PPR-PDE 240X identifying the backup element (NE 114). Similar to the backup end-to-end PPR tree 1103 described above with reference to FIG. 11, the backup end-to-end PPR tree 1103 shown in FIG. 13 includes a primary branch 1005A and two secondary branches 1005B-C. The primary branch 1005A includes the following elements: ingress NE 101, link 128, NE 111, link 129, NE 110, link 130, NE 109, link 131, NE 109, link 132, and egress NE 107. The secondary branch 1005B extends from NE 116, which is not part of the primary branch 1005A, to NE 111, which is part of the primary branch 1005A, via link 145, NE 112, and link 142. The secondary branch 1005C extends from NE 117, which is not part of the primary branch 1005A, to NE 110, which is part of the primary branch 1005A, via link 146, NE 113, and link 143.

In an embodiment, one or more of the NEs 101-119 in network 1300 receives the PPR information 210 and the backup PPR information 230 in the advertisement 1200 and stores the PPR information 210 and the backup PPR information 230 in an entry 345 in the forwarding database 343 corresponding to a destination address 515 (either of the destination 180 or the egress NE 107). The backup PPR-PDE 240X may be stored in the local forwarding database 343 after receiving the advertisement 1200. However, the PPR-PDEs 220A-N and 220X-Z may already be stored at the local forwarding database 343 of one or more of the NEs 101-119 in association with the backup PPR-ID 235.

Subsequently, during transmission of data packets 505 including the PPR-ID 215, the failure 161A of link 139 along the PPR 120 may be detected by an adjacent NE 117. In this case, when NE 117 receives a data packet 505 comprising the PPR-ID 215, the NE 117 performs a lookup at the local forwarding database 343 for the PPR-ID 215 to determine a next hop or element toward which to forward the data packet. At first, the NE 117 uses the PPR-PDEs 220X to determine that the next element toward which to forward the data packet 505 is link 139. However, since link 139 is unavailable due to the failure 161A, in this embodiment, NE 117 first determines whether a flag in the PPR flags 406X for the PPR-PDE 220X associated with link 139 indicates that a backup PPR-PDE 240X is set for the PPR-PDE 220X. In this example, no such backup PPR-PDE 240X is set for the PPR-PDE 220X. Therefore, NE 117 next determines whether the PPR flags 403, or at least one of the PPR-PDE flags 406A-N, include a flag that is set to indicate that there is a backup PPR-ID 235 corresponding to the backup end-to-end PPR tree 1103 set for the PPR-ID 215. In this example, the backup PPR information 230 includes a backup PPR-ID 235 for the backup PPR 205 implemented as a backup end-to-end PPR tree 1103. After obtaining the backup PPR-ID 235 for the backup PPR 205 implemented as a backup end-to-end PPR tree 1103, NE 117 may use the PPR-PDEs 220A-N and 220X-Z to determine a next element along the branch 1005C along which to redirect the data packets 505 to avoid link 139, similar to that which is described with reference to FIG. 11.

As another example, supposing that link 139 is available, but link 140 is no longer available due to a failure 161B occurring at link 140, then an adjacent NE 118 may detect that link 140 is unavailable to transmit data. In this case, when NE 118 receives a data packet 505 comprising the PPR-ID 215, the NE 118 performs a lookup at the local forwarding database 343 for the PPR-ID 215 to determine a next hop or element toward which to forward the data packet 505. At first, the NE 118 uses the PPR-PDEs 220X to determine that the next element toward which to forward the data packet 505 is link 140. However, since link 140 is unavailable due to the failure 161B, in this embodiment, NE 117 first determines whether a flag in the PPR flags 406X for the PPR-PDE 220X associated with link 139 indicates that a backup PPR-PDE 240X is set for the PPR-PDE 220X. In this example, a backup PPR-PDE 240X is set for the PPR-PDE 220X. Therefore, NE 118 obtains the backup PPR-PDE 240X to determine the next element along which to redirect traffic to avoid transmitting data packets 505 over link 140. NE 118 redirects the data packet 505 to NE 114 via link 147 in a manner similar to that which is described above with reference to FIG. 5.

In this example, once the data packet 505 reaches NE 114, NE 114 either determines the next element on the PPR 120 toward which to forward the data packet 505 to avoid the link 140 using an entry 345 in the local forwarding database 343 or determines a next element between NE 114 and egress NE 107 based on a shortest path 145 between NE 114 and egress NE 107. In this way, NE 114 continues transmitting the data packet 505 to NE 107.

Figure 14:
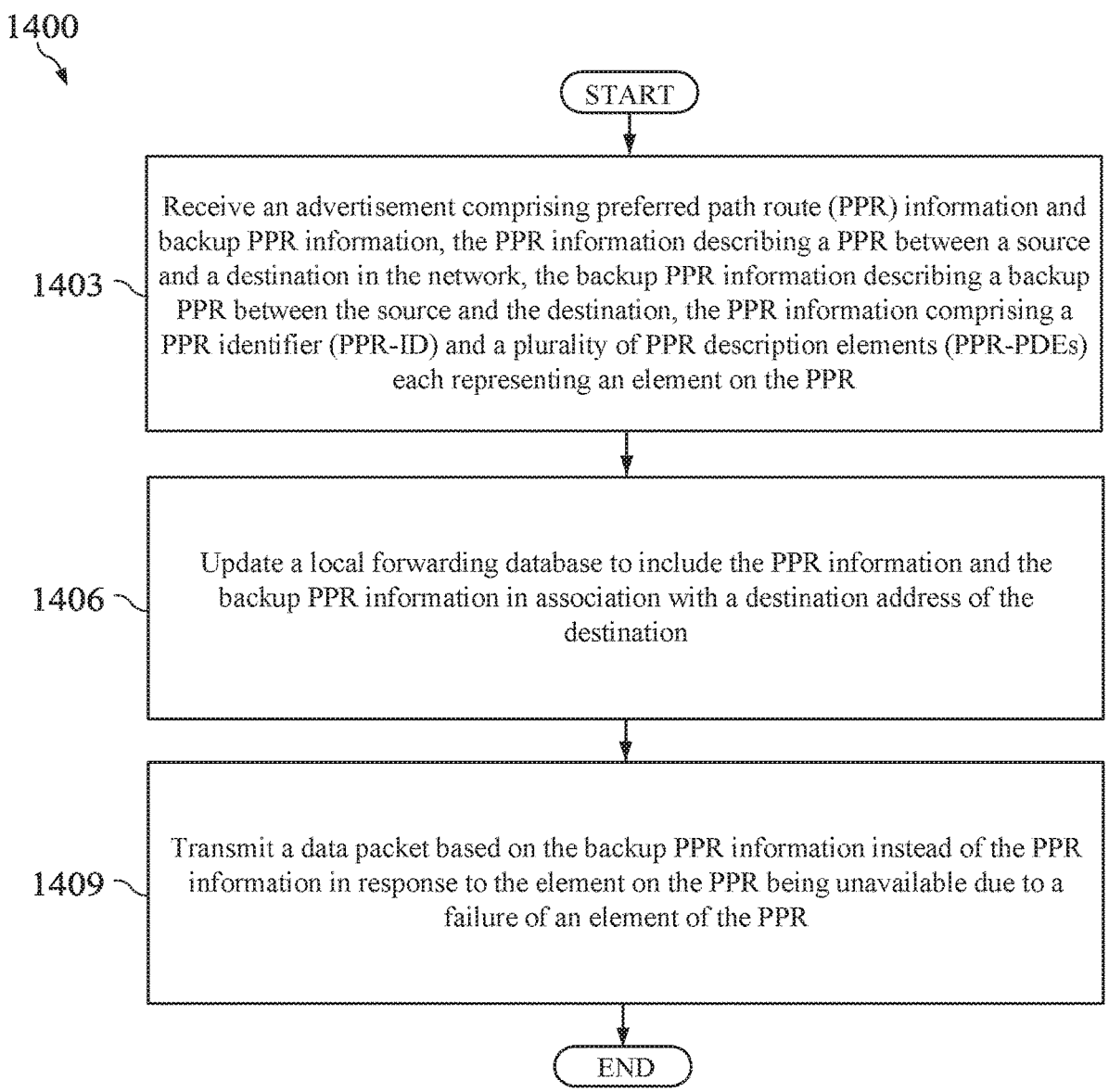
FIG. 14 is a method for implementing backup PPRs and fast re-route mechanisms according various embodiments of the disclosure.

FIG. 14 is a method 1400 for implementing backup PPRs and fast re-route mechanisms according various embodiments of the disclosure. In an embodiment, method 1400 may be performed by a headend or ingress NE 101-112 in any of networks 100, 200, 500, 600, 900, 1100, and 1300. In an embodiment, method 1400 may be performed after a central entity 171 obtains and transmits PPR information 210 and backup PPR information 230 to an NE in the network.

At step 1403, an advertisement including PPR information 210 and backup PPR information 230 is received, either from the central entity 171 or another NE in the network. The Rx 320 receives the advertisement including PPR information 210 and backup PPR information 230. The advertisement received may be similar to advertisement 400, 800, 1000, or 1200. The PPR information 210 describes a PPR 120 between a source and destination in the network. The source may be the source 170 or an ingress NE 101, and the destination may be the destination 180 or the egress NE 107. The backup PPR information 230 includes information describing a backup PPR 205 between the source and destination. The backup PPR 205 may be implemented as a backup element, a backup end-to-end PPR, and/or a backup end-to-end PPR tree. The PPR information 210 includes a PPR-ID 215 and a plurality of PPR-PDEs 220A-N, each representing an element on the PPR 120.

At step 1406, a local forwarding database 343 of the NE 300 is updated to include the PPR information 210 and the backup PPR information 230 in association with a destination address 515 of the destination. The local forwarding database 343 in the memory 360 of NE 300 is updated to include an entry 345 corresponding to the destination address 515 including the PPR information 210 and the backup PPR information 230. The destination address 515 of the destination may be an address, label, or ID of the egress NE 107 or the destination 180.

At step 1409, a data packet 505 is transmitted based on the backup PPR information 230 instead of the PPR information 210 in response to an element on the PPR 120 being unavailable due to a failure of an element on the PPR. When the backup PPR information 230 includes information describing a backup PPR 205 implemented as a backup element, the data packet 505 is transmitted to the backup element to avoid transmitting along the element on the PPR 120 that is unavailable. When the backup PPR information 230 includes information describing a backup PPR 205 implemented as a backup end-to-end PPR or a backup end-to-end PPR tree, the data packet 505 is transmitted along the backup end-to-end PPR or a branch of the backup end-to-end PPR tree to avoid transmitting along the element on the PPR 120 that is unavailable.

In some embodiments, a backup element comprises at least one of a link, another NE, or a segment adjacent to the NE. In some embodiments, a next element comprises at least one of a link, another NE, or a segment adjacent to the NE. In some embodiments, an attribute 225 associated with a resource reserved on the PPR 120 matches an attribute associated with a resource reserved on the backup PPR 205.

Figure 15:
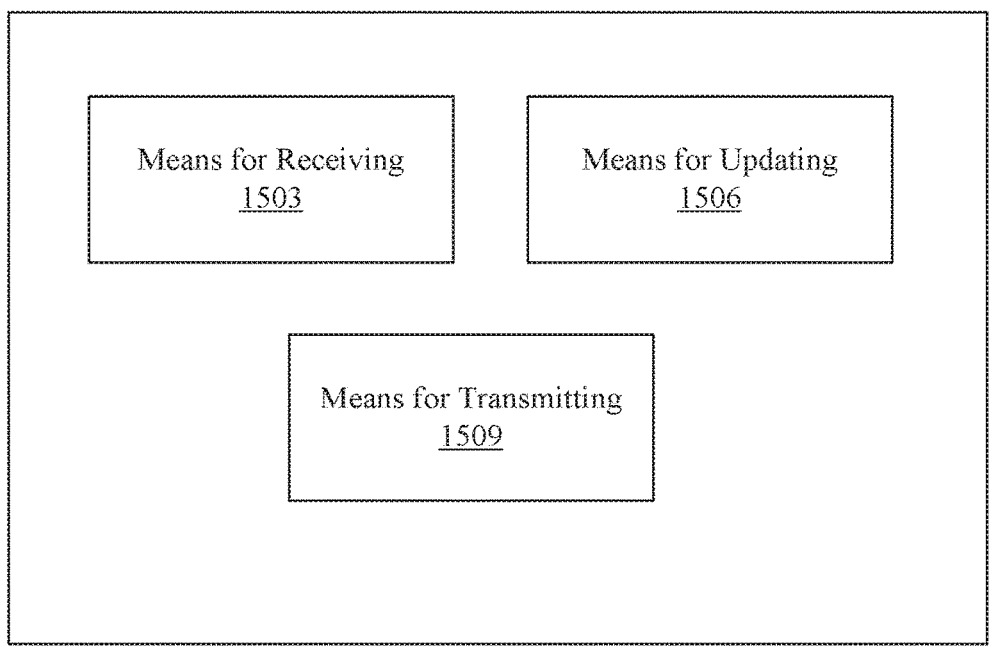
FIG. 15 shows an apparatus for implementing backup PPRs and fast re-route mechanisms according various embodiments of the disclosure.

FIG. 15 shows an apparatus 1500 for implementing backup PPRs and fast re-route mechanisms according to various embodiments of the disclosure. The apparatus 1500 comprises a means for receiving 1503, a means for updating 1506, and a means for transmitting 1509. The means for receiving 1503 comprises a means to receive an advertisement including PPR information 210 and backup PPR information 230. The advertisement received may be similar to advertisement 400, 800, 1000, or 1200. The PPR information 210 describes a PPR 120 between a source and destination in the network. The source may be the source 170 or an ingress NE 101, and the destination may be the destination 180 or the egress NE 107. The backup PPR information 230 includes information describing a backup PPR 205 between the source and destination. The backup PPR 205 may be implemented as a backup element, a backup end-to-end PPR, and/or a backup end-to-end PPR tree. The PPR information 210 includes a PPR-ID 215 and a plurality of PPR-PDEs 220A-N, each representing an element on the PPR 120.

The means for updating 1006 comprises a means to update a local forwarding database 343 of the NE 300 to include the PPR information 210 and the backup PPR information 230 in association with a destination address 515 of the destination. The local forwarding database 343 is updated to include an entry 345 corresponding to the destination address 515 including the PPR information 210 and the backup PPR information 230. The destination address 515 of the destination may be an address, label, or ID of the egress NE 107 or the destination 180.

The means for transmitting 1009 comprises a means to transmit the data packet 505 based on the backup PPR information 230 instead of the PPR information 210 in response to an element on the PPR 120 being unavailable. When the backup PPR information 230 includes information describing a backup PPR 205 implemented as a backup element, the data packet 505 is transmitted to the backup element to avoid transmitting along the element on the PPR 120 that is unavailable. When the backup PPR information 230 includes information describing a backup PPR 205 implemented as a backup end-to-end PPR or a backup end-to-end PPR tree, the data packet 505 is transmitted along the backup end-to-end PPR or a branch of the backup end-to-end PPR tree to avoid transmitting along the element on the PPR 120 that is unavailable.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

What is claimed is:

1. A method implemented by a network element (NE) in a network, comprising:

receiving, by the NE, preferred path route (PPR) information and backup PPR information, the PPR information describing a PPR between a source and a destination in the network, the backup PPR information describing a backup end-to-end PPR tree including a plurality of backup PPRs, each of the backup PPRs being a path extending from a single NE on the PPR to another NE in the network, the PPR information comprising a PPR identifier (PPR-ID) and a plurality of PPR description elements (PPR-PDEs) each representing one of the elements on the PPR, the backup PPR information comprising a backup PPR-ID identifying the backup end-to-end PPR tree;

storing by the NE, a local forwarding database including the PPR-ID in association with a PPR-PDE for a next element on the PPR and the backup PPR-ID in association with a backup PPR-PDE for a backup element on the backup PPR; and transmitting, by the NE, a data packet based on the backup PPR information instead of the PPR information in response to an element on the PPR being unavailable due to a failure of another element along the PPR.

2. The method of claim 1, wherein the backup PPR information comprises the backup PPR-PDE describing the backup element, wherein transmitting the data packet based on the backup PPR information comprises transmitting the data packet to the backup element instead of the next element on the PPR in response to determining that the next element on the PPR is unavailable.

3. The method of claim 2, wherein a PPR-PDE describing the NE and included in the plurality of PPR-PDEs comprises a flag indicating that the backup element is described in the backup PPR-PDE.

4. The method of claim 1, wherein the local forwarding database stores a plurality of PPR-PDEs in association with a destination address of the destination and the backup PPR-PDE.

5. The method of claim 1, further comprising:
determining, by the NE, that the next element on the PPR is unavailable;
searching, by the NE, the local forwarding database for the backup PPR-PDE describing the backup element for the next element on the PPR; and
transmitting, by the NE, the data packet to the backup element instead of the next element on the PPR.

6. The method of claim 1, wherein the backup element on the backup PPR comprises at least one of a backup link, a backup NE, or a backup segment adjacent to the NE, and wherein the next element on the PPR comprises at least one of a next link, a next NE, or a next segment adjacent to the NE.

7. A network element (NE) implemented in a network, comprising:
a memory configured to store instructions; and
a processor coupled to the memory and configured to execute the instructions, which cause the processor to be configured to:
receive preferred path route (PPR) information and backup PPR information, the PPR information describing a PPR between a source and a destination in the network, the backup PPR information describing a backup end-to-end PPR tree including a plurality of backup PPRs, each of the backup PPRs being a path extending from a single NE on the PPR to another NE in the network, the PPR information comprising a PPR identifier (PPR-ID) and a plurality of PPR description elements (PPR-PDEs) each representing one of the elements on the PPR, the backup PPR information comprising a backup PPR-ID identifying the backup end-to-end PPR tree;
store a local forwarding database including the PPR-ID in association with a PPR-PDE for a next element on the PPR and the backup PPR-ID in association with a backup PPR-PDE for a backup element on the backup PPR; and
transmit a data packet based on the backup PPR information instead of the PPR information in response to an element on the PPR being unavailable due to a failure on another element of the PPR.

8. The NE of claim 7, wherein an attribute associated with a resource reserved on the PPR matches an attribute associated with a resource reserved on the backup PPR.

9. The NE of claim 7, wherein the local forwarding database stores the PPR information and the backup PPR information only in response to determining that the NE is identified in one of the PPR-PDEs.

10. The NE of claim 7, further comprising receiving a flag set to indicate that the PPR-ID identifies a loose PPR between the source and the destination, and wherein the plurality of PPR-PDEs describes a subset of NEs on the PPR.

11. The NE of claim 10, wherein a path between two NEs of the loose PPR is unavailable, and
wherein the instructions further cause the processor to be configured to:
search the local forwarding database for the backup PPR-PDE describing the backup element; and
transmit the data packet to the backup element instead of the next element on the PPR.

12. The NE of claim 7, wherein the instructions further cause the processor to be configured to:
determine that the next element on the PPR is unavailable;
search the local forwarding database for the backup PPR-ID describing the backup PPR;
update the data packet to include the backup PPR-ID instead of the PPR-ID; and
transmit the data packet along the backup PPR instead of the next element on the PPR.

13. The NE of claim 7, wherein the backup PPR information includes a backup PPR-PDE describing the backup element.

14. The NE of claim 7, wherein the instructions further cause the processor to be configured to:
determine, by the NE, that the next element on the PPR is unavailable;
transmit, by the NE, the data packet to the backup element instead of the next element on the PPR in response to the local forwarding database storing the backup PPR-PDE describing the backup element; and
transmit, by the NE, the data packet along the backup PPR in response to the local forwarding database not storing the backup PPR-PDE describing the backup element and in response to the local forwarding database storing the backup PPR-ID.

15. A non-transitory computer readable medium configured to store a computer program product comprising computer executable instructions that, when executed by a processor of a network element (NE) implemented in a network, cause the processor to:
receive preferred path route (PPR) information and backup PPR information, the PPR information describing a PPR between a source and a destination in the network, the backup PPR information describing a backup end-to-end PPR tree including a plurality of backup PPRs, each of the backup PPRs being a path extending from a single NE on the PPR to another NE in the network, the PPR information comprising a PPR identifier (PPR-ID) and a plurality of PPR description elements (PPR-PDEs) each representing one of the elements on the PPR, the backup PPR information comprising a backup PPR-ID identifying the backup end-to-end PPR tree;

store a local forwarding database including the PPR-ID in association with a PPR-PDE for a next element on the PPR and the backup PPR-ID in association with a backup PPR-PDE for a backup element on the backup PPR; and transmit a data packet based on the backup PPR information instead of the PPR information in response to an element on the PPR being unavailable due to a failure on another element of the PPR.

16. The non-transitory computer readable medium of claim 15, wherein the backup PPR information comprises the backup PPR-PDE describing the backup element, wherein transmitting the data packet based on the backup PPR information comprises transmitting the data packet to the backup element instead of the next element on the PPR in response to determining that the next element on the PPR is unavailable.

17. The non-transitory computer readable medium of claim 16, wherein a PPR-PDE describing the NE and included in the plurality of PPR-PDEs comprises a flag indicating that the backup element is described in the backup PPR-PDE.

18. The non-transitory computer readable medium of claim 15, wherein the backup PPR information includes the backup PPR-PDE describing the backup element.

19. The non-transitory computer readable medium of claim 15, wherein the computer executable instructions further cause the processor to:

determine that the next element on the PPR is unavailable;

search the local forwarding database for the backup PPR-PDE describing the backup element; and transmit the data packet to the backup element instead of the next element on the PPR.

20. The non-transitory computer readable medium of claim 15, wherein the computer executable instructions further cause the processor to:

determine that the next element on the PPR is unavailable;

transmit the data packet to the backup element instead of the next element on the PPR in response to the local forwarding database storing the backup PPR-PDE describing the backup element; and transmit the data packet along the backup PPR in response to the local forwarding database not storing the backup PPR-PDE describing the backup element and in response to the local forwarding database storing the backup PPR-ID.

* * * * *